(12) United States Patent
Mizuochi

(10) Patent No.: US 8,094,066 B2
(45) Date of Patent: Jan. 10, 2012

(54) METHOD AND SYSTEM FOR CALCULATING POSITION

(75) Inventor: Shunichi Mizuochi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 12/970,833

(22) Filed: Dec. 16, 2010

(65) Prior Publication Data

US 2011/0148695 A1    Jun. 23, 2011

(30) Foreign Application Priority Data

Dec. 18, 2009   (JP) .................................. 2009-288180

(51) Int. Cl.
*G01S 19/45* (2010.01)

(52) U.S. Cl. ................................................ 342/357.28

(58) Field of Classification Search .............. 342/357.28
See application file for complete search history.

(56) References Cited

U.S. PATENT DOCUMENTS

| | | | | |
|---|---|---|---|---|
| 4,402,049 A * | 8/1983 | Gray | .............................. | 701/205 |
| 4,405,986 A * | 9/1983 | Gray | ................................ | 701/4 |
| 5,375,059 A * | 12/1994 | Kyrtsos et al. | ................ | 701/215 |
| 5,896,304 A * | 4/1999 | Tiemann et al. | ................. | 708/5 |
| 6,329,946 B1 * | 12/2001 | Hirata et al. | ............ | 342/357.62 |
| 6,397,146 B1 * | 5/2002 | Bruner | ........................... | 701/213 |
| 7,102,567 B2 * | 9/2006 | Stone | ....................... | 342/357.63 |
| 7,821,453 B2 * | 10/2010 | Wu et al. | .................. | 342/357.28 |
| 2004/0064234 A1 * | 4/2004 | Okamoto | ........................ | 701/70 |
| 2005/0114023 A1 * | 5/2005 | Williamson et al. | .......... | 701/214 |
| 2007/0213085 A1 * | 9/2007 | Fedora | ........................... | 455/504 |
| 2008/0243378 A1 * | 10/2008 | Zavoli | ........................... | 701/209 |
| 2010/0265130 A1 * | 10/2010 | Mao | .......................... | 342/357.28 |

FOREIGN PATENT DOCUMENTS

JP        2001-349935 A        12/2001

* cited by examiner

*Primary Examiner* — Thomas Tarcza
*Assistant Examiner* — Frank McGue
(74) *Attorney, Agent, or Firm* — Kilpatrick Townsend & Stockton LLP

(57) ABSTRACT

A method for calculating a position of a moving vehicle using a first unit that performs a correlation process on a satellite signal received from a satellite to capture the satellite signal and calculate the position and velocity of the moving vehicle and a second unit capable of detecting at least the velocity of the moving vehicle includes: calculating a determination velocity which is the velocity determined using the results of the calculation by the first unit and the results of the detection by the second unit; determining a correlation integration period used when the first unit performs the correlation process using the error in the determination velocity; and calculating the position of the moving vehicle using the results of the calculation by the first unit and the results of the detection by the second unit.

5 Claims, 16 Drawing Sheets

| TIME INSTANT | VELOCITY/VELOCITY ERROR | | |
|---|---|---|---|
| | INS | GPS | VELOCITY/ORIENTATION |
| t1 | (Ui1,Vi1,Wi1) / (U$_{\sigma}$i1,V$_{\sigma}$i1,W$_{\sigma}$i1) | (Ug1,Vg1,Wg1) / (U$_{\sigma}$g1,V$_{\sigma}$g1,W$_{\sigma}$g1) | (Us1,Vs1,Ws1) / (U$_{\sigma}$s1,V$_{\sigma}$s1,W$_{\sigma}$s1) |
| t2 | (Ui2,Vi2,Wi2) / (U$_{\sigma}$i2,V$_{\sigma}$i2,W$_{\sigma}$i2) | (Ug2,Vg2,Wg2) / (U$_{\sigma}$g2,V$_{\sigma}$g2,W$_{\sigma}$g2) | (Us2,Vs2,Ws2) / (U$_{\sigma}$s2,V$_{\sigma}$s2,W$_{\sigma}$s2) |
| t3 | (Ui3,Vi3,Wi3) / (U$_{\sigma}$i3,V$_{\sigma}$i3,W$_{\sigma}$i3) | (Ug3,Vg3,Wg3) / (U$_{\sigma}$g3,V$_{\sigma}$g3,W$_{\sigma}$g3) | (Us3,Vs3,Ws3) / (U$_{\sigma}$s3,V$_{\sigma}$s3,W$_{\sigma}$s3) |
| ... | ... | ... | ... |

| OUTPUT STATE 1251 | | | OUTPUT TYPE 1253 |
|---|---|---|---|
| INS | GPS | VELOCITY/ ORIENTATION | |
| ON | ON | ON | TYPE A |
| ON | ON | OFF | TYPE B |
| ON | OFF | ON | TYPE C |
| ⋮ | ⋮ | ⋮ | ⋮ |

FIG. 4

| MOVEMENT STATE | WEIGHTED-AVERAGE WEIGHTING PATTERN | | |
|---|---|---|---|
| | α (INS) | β (GPS) | γ (VELOCITY/ORIENTATION) |
| STANDSTILL | 0.1 × [σi/(σi+σg+σs)] | 0.1 × [σg/(σi+σg+σs)] | 0.8 × [σs/(σi+σg+σs)] |
| CONSTANT VELOCITY | 0.1 × [σi/(σi+σg+σs)] | 0.8 × [σg/(σi+σg+σs)] | 0.1 × [σs/(σi+σg+σs)] |
| ACCELERATION/ DECELERATION | 0.8 × [σi/(σi+σg+σs)] | 0.1 × [σg/(σi+σg+σs)] | 0.1 × [σs/(σi+σg+σs)] |
| ... | ... | ... | ... |

FIG.15

| DOPPLER ERROR [Hz] | CORRELATION INTEGRATION PERIOD [msec] |
|---|---|
| 50~ | 10 |
| 25~50 | 20 |
| 10~25 | 50 |
| 5~10 | 100 |
| 2.5~5 | 200 |
| 1~2.5 | 500 |
| 0.5~1 | 1000 |
| ... | ... |

FIG.16

METHOD AND SYSTEM FOR CALCULATING POSITION

BACKGROUND

1. Technical Field

The present invention relates to a method and a system for calculating the position of a moving vehicle.

2. Related Art

GPS (Global Positioning System) is widely known as a positioning system which uses a positioning signal and is used in a position calculation device that is provided in a portable phone, a car navigation device, and the like. In the GPS, a position calculation computation is performed so as to calculate the position coordinates and timepiece errors of the position calculation device based on information such as the positions of a plurality of GPS satellites and a pseudo-range from each GPS satellite to the position calculation device.

A GPS satellite signal transmitted from a GPS satellite is modulated with spread codes, called CA (Coarse and Acquisition) codes, different for each GPS satellite. The position calculation device performs a correlation operation between the received signal and replica CA codes which are the replica of the CA codes to capture the GPS satellite signal based on the correlation value. In this case, when the GPS satellite signal is captured from weak received signals, in order to easily detect the peak of the correlation value, a method of integrating the correlation values acquired through the correlation operation over a predetermined integration period is used.

However, since the CA codes themselves which spread-modulate the GPS satellite signal are also subjected to BPSK (Binary Phase Shift Keying) modulation every 20 ms with a navigation message, the polarities of the CA codes are reversed every 20 ms. Therefore, when the correlation values are integrated according to this reversal time, there is a problem in that correlation values of different signs are integrated. As a technique for solving this problem, JP-A-2001-349935 discloses a technique of integrating the correlation values based on polarity reversal timing information acquired from the outside.

According to the technique of JP-A-2001-349935, it is possible to increase the correlation integration period to be longer than 20 ms. However, increasing the correlation integration period causes other problems. One such problem is the Doppler effect. For example, if the moving velocity of the position calculation device changes, the Doppler frequency changes. As a result, the search frequency may gradually change during the long correlation integration period and eventually be located out of the initial frequency search range. For example, when the position calculation device is moving at an acceleration of 1 [G], a variation of the Doppler frequency is 50 [Hz/s]. That is, if the moving velocity changes, the actual search frequency will deviate from an initially intended search frequency.

In theory, if the Doppler frequency is not changed, the correlation integration value for a specific frequency becomes large as the integration of the correlation values proceeds. Thus, the specific frequency (=receiving frequency) can be easily identified by the peak of the correlation integration value. However, in practice, since the Doppler frequency changes, there is a shift between the actual search frequency and the initially intended frequency, and the specific frequency itself will change. As a result, paradoxically, it is difficult to identify the peak of the correlation integration value if the correlation integration is performed for a predetermined period or longer.

Thus, it may not possible to capture the satellite signal even when the correlation integration period is increased.

SUMMARY

An advantage of some aspects of the invention is to enable a correlation process to be performed appropriately while considering changes in the Doppler frequency.

According to a first aspect of the invention, there is provided a method for calculating a position of a moving vehicle using a first unit that performs a correlation process on a satellite signal received from a satellite to capture the satellite signal and calculate the position and velocity of the moving vehicle and a second unit capable of detecting at least the velocity of the moving vehicle includes: calculating a determination velocity which is the velocity determined using the results of the calculation by the first unit and the results of the detection by the second unit; calculating an error in the determination velocity using an error in the calculation by the first unit and an error in the detection by the second unit; determining a Doppler frequency which is used when the first unit determines the frequency used for searching for the satellite signal using the determination velocity; determining a correlation integration period used when the first unit performs the correlation process using the error in the determination velocity; and calculating the position of the moving vehicle using the results of the calculation by the first unit and the results of the detection by the second unit.

According to another aspect of the invention, there is provided a system including a first unit that performs a correlation process on a satellite signal received from a satellite to capture the satellite signal and calculate the position and velocity of a moving vehicle; a second unit that is capable of detecting at least the velocity of the moving vehicle; a determination velocity calculation unit that calculates a determination velocity which is the velocity determined using the results of the calculation by the first unit and the results of the detection by the second unit; an error calculation unit that calculates an error in the determination velocity using an error in the calculation by the first unit and an error in the detection by the second unit; a Doppler frequency determination unit that determines a Doppler frequency which is used when the first unit determines the frequency used for searching for the satellite signal using the determination velocity; a correlation integration period determination unit that determines a correlation integration period used when the first unit performs the correlation process using the error in the determination velocity; and a position calculation unit that calculates the position of the moving vehicle using the results of the calculation by the first unit and the results of the detection by the second unit.

According to the first aspect and the like, the determination velocity is calculated using the results of the calculation by the first unit that calculates the position and velocity using the satellite signal and the results of the detection by the second unit capable of detecting at least the velocity. Moreover, the error in the determination velocity is calculated using the error in the calculation by the first unit and the error in the detection by the second unit. Moreover, the Doppler frequency used when the first unit determines the search frequency is determined using the error in the determination velocity, and the correlation integration period used when the first unit performs the correlation process is determined using the error in the determination velocity. Then, the position is calculated using the results of the calculation by the first unit and the results of the detection by the second unit.

The Doppler frequency due to the movement of the first unit can be predicted using the velocity detected by the second unit. However, the predicted Doppler frequency may change according to the movement state or the like of the first unit. The error (=variation of the Doppler frequency) of the Doppler frequency in that case can be approximated based on the velocity error. Therefore, the use of the error (error in the determination velocity) that may be included in the determination velocity calculated using the results of the calculation by the first unit and the results of the detection by the second unit enables the correlation integration period to be determined appropriately while considering the changes in the Doppler frequency.

As a second aspect, in the method of the first aspect, the calculating of the error in the determination velocity may include calculating the error in the determination velocity in the direction of the line of sight towards a positioning satellite transmitting the satellite signal.

According to the second aspect, the error in the determination velocity in the direction of the line of sight towards the positioning satellite transmitting the satellite signal is calculated. By calculating the determination error in the direction of the line of sight towards the positioning satellite, the error in the Doppler frequency can be determined appropriately.

As a third aspect, in the method of the first or second aspect, the calculating of the error in the determination velocity may include calculating a weighted average of the error in the calculation by the first unit and the error in the detection by the second unit.

In this case, as a fourth aspect, in the method of the third aspect, the calculating of the weighted average may include changing the weight used for calculating the weighted average according to a movement state.

According to the fourth aspect, by determining whether the weighted average will be calculated by weighting and trusting the error in the calculation by the first unit or the error in the detection by the second unit according to the movement state, a more accurate determination velocity error can be calculated.

As a fifth aspect, in the method of the third or fourth aspect, the calculating of the weighted average may include changing the weight used for calculating the weighted average according to whether or not the first unit is in a state of being able to calculate the position and whether or not the second unit is in a state of being able to perform the detection.

According to the fifth aspect, by changing the weight used for calculating the weighted average according to whether or not the first unit is in a state of being able to calculate the position and whether or not the second unit is in a state of being able to perform the detection, the determination velocity error can be calculated appropriately according to the satellite signal receiving environment, the detection state of the second unit, and the like. For example, when the moving vehicle is located in a tunnel, it may be temporarily unable to receive the satellite signal. However, it is possible to appropriately cope with such a situation.

As a sixth aspect, in the method of any one of the third to fifth aspects, the calculating of the weighted average may include changing the weight used for calculating the weighted average according to relative values between the error in the calculation by the first unit and the error in the detection by the second unit.

According to the sixth aspect, by changing the weight used for calculating the weighted average according to relative values between the error in the calculation by the first unit and the error in the detection by the second unit, the accuracy of the calculated determination velocity error can be improved further.

As a seventh aspect, in the method of any one of the first to sixth aspects, the first unit may be a unit that performs the correlation process by summing correlation integration values each time the correlation integration period elapses and performs a process of calculating the position through the correlation process every predetermined interval of time, and the method may further include adjusting an ending time of the summing of the correlation integration values in a single correlation process based on the predetermined intervals of time and the correlation integration period.

According to the seventh aspect, the first unit performs the correlation process by summing correlation integration values each time the correlation integration period elapses. Moreover, the first unit performs a process of calculating the position through the correlation process every predetermined interval of time and adjusts the ending time of the summing of the correlation integration values in a single correlation process based on the predetermined intervals of time and the correlation integration period.

Since the correlation integration period is determined using the determination velocity error, the correlation integration period is not always constant. However, according to the seventh aspect, even when the correlation integration period varies, the ending time of the summing of the correlation integration values in a single correlation process is adjusted so that the correlation integration values are appropriately summed each time the respective correlation integration periods elapse.

BRIEF DESCRIPTION OF THE DRAWINGS

The invention will be described with reference to the accompanying drawings, wherein like numbers reference like elements.

FIG. 3 is a diagram showing an example of the data configuration of velocity/velocity error data.

FIG. 4 is a diagram showing an example of the table configuration of an output type determination table.

FIG. 15 is a diagram showing an example of weighted-average weighting pattern data according to a modification.

FIG. 16 is a diagram showing an example of the table configuration of a correlation integration period determination table according to a modification.

DESCRIPTION OF EXEMPLARY EMBODIMENTS

Hereinafter, exemplary embodiments of the invention will be described with reference to the drawings. It should be noted that embodiments to which the invention can be applied are not limited to the embodiments described below.

1. System Configuration

Figure 1:
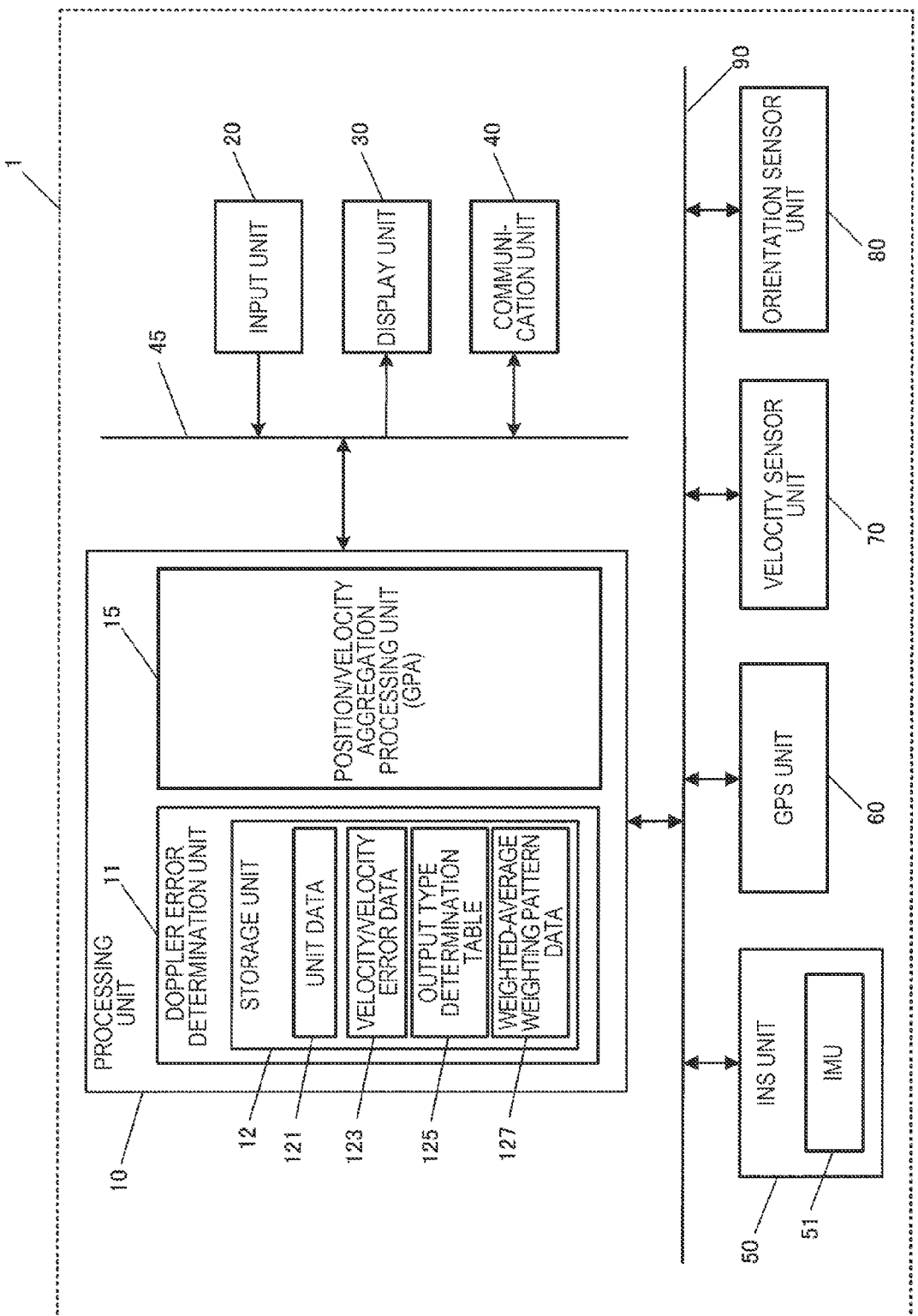
FIG. 1 is a block diagram showing an example of the functional configuration of a position calculation system.

FIG. 1 is a block diagram showing a functional configuration of a position calculation system 1 (position calculation device) according to the present embodiment. The position calculation system 1 is one kind of position calculation device, and in the present embodiment, will be described as being a navigation device which is mounted on moving vehicles such as automobiles or buses. However, the position calculation system 1 can be applied to other electronic apparatuses such as a portable phone including a smart phone, a notebook-type personal computer, or a PDA (Personal Digital Assistant).

The position calculation system 1 is provided with its position relative to a moving vehicle fixed and includes an orientation sensor unit 80 by which the position calculation system 1 is able to detect a moving direction of the moving vehicle as a moving direction of the position calculation system 1.

The position calculation system 1 is a computer system which is configured to include a processing unit 10, an input unit 20, a display unit 30, a communication unit 40, an INS (Inertial Navigation System) unit 50, a GPS (Global Positioning System) unit 60, a velocity sensor unit 70, and the orientation sensor unit 80.

The processing unit 10, the input unit 20, the display unit 30, and the communication unit 40 are connected via a first data bus 45. Moreover, the processing unit 10, the INS unit 50, the GPS unit 60, the velocity sensor unit 70, and the orientation sensor unit 80 are connected via a second data bus 90.

The processing unit 10 is a controller that controls an overall operation of the position calculation system 1, and is configured to include various functional units which are a Doppler error determination unit 11 and a position/velocity aggregate processing unit (hereinafter referred to as a "GPA (Generic Position Algorithm") 15.

The Doppler error determination unit 11 is a processing circuit block that determines an estimated variation (hereinafter referred to as a "Doppler error") of a Doppler frequency generated by movement of the position calculation system 1. The Doppler shift is generated by movement of the position calculation system 1, and the Doppler frequency generated in that case changes due to a movement state or the like of the position calculation system 1. The Doppler error determination unit 11 calculates a variation of the Doppler frequency as a Doppler error using unit information from the respective units.

The Doppler error determination unit 11 includes a processor such as digital signal processor (DSP) and a memory and executes a Doppler error determination process described later as digital signal processing. The Doppler error determination unit 11 includes a storage unit 12 as a memory that stores various kinds of data.

The storage unit 12 is configured by a storage device such as a ROM (Read Only Memory), a flash ROM, or a RAM (Random Access Memory), and stores a system program which allows the processing unit 10 to control the position calculation system 1 and programs, data, and the like which allow the Doppler error determination unit 11 to determine a Doppler error. Moreover, the storage unit 12 forms work areas in which various kinds of programs executed by the Doppler error determination unit 11, data being processed for various kinds of processes, processing results, and the like are temporarily stored.

In the storage unit 12, various data are stored, for example, including: unit data 121 which are data of unit information output from the respective units; velocity/velocity error data 123 which are data of the velocity and the velocity error of the position calculation system 1 calculated using the unit information, an output type determination table 125 used for determining an output type of the unit information of the respective units, and weighted-average weighting pattern data 127 in which a weighting pattern used when calculating a weighted average of the unit information of the respective units is defined.

FIG. 3 is a diagram showing an example of the data configuration of the velocity/velocity error data 123. In the velocity/velocity error data 123, a velocity/velocity error 1233 calculated using the unit information of the respective units is stored in a time-series order so as to be correlated with a time instant 1231. The Doppler error determination unit 11 calculates a velocity and a velocity error in the geocentric orthogonal coordinate system of the position calculation system 1 based on the unit information stored in the unit data 121 and stores the velocity and velocity error in the velocity/velocity error data 123. Information output by the respective units of the INS unit 50, the GPS unit 60, the velocity sensor unit 70, and the orientation sensor unit 80 is referred to as "unit information."

In the present embodiment, the GPS unit 60 calculates the position, velocity, and errors thereof in the ECEF (Earth Centered Earth Fixed) coordinate system. On the other hand, the INS unit 50 calculates the position, velocity, and errors thereof in the ENU (East North Up) coordinate system. Moreover, the velocity sensor unit 70 detects the velocity in the moving direction of the position calculation system 1 and the error thereof, and the orientation sensor unit 80 detects an orientation representing the moving direction of the position calculation system 1 and the error thereof. The Doppler error determination unit 11 performs a process of calculating the velocity and velocity error of the position calculation system 1 in the ECEF coordinate system based on the unit information acquired from the respective units via the second data bus 90.

The ECEF coordinate system is a 3-axis orthogonal coordinate system known as an earth-centered earth-fixed coordinate system in which the origin is at the center of the earth (center of gravity of the earth), the Z axis corresponds to the axis of rotation of the earth, the X axis corresponds an axis that intersects the Greenwich meridian plane and the equatorial plane, and the Y axis corresponds to an axis that is orthogonal to these two axes. Moreover, the ENU coordinate system is a 3-axis orthogonal coordinate system known as an east-north-up coordinate system in which the original is at a certain point near the earth surface, the U axis corresponds to the apex direction (the up direction of a vertical line to the earth surface), the E axis corresponds to the east direction, and the N axis corresponds to the north direction.

Transformation of coordinates between the ENU coordinate system and the ECEF coordinate system can be achieved through a matrix operation or the like.

FIG. 4 is a diagram showing an example of the table configuration of the output type determination table 125. In the output type determination table 125, an output state 1251 of the unit information of the respective units and an output type 1253 which is correlated with the respective output state 1251 in a one-to-one correspondence are stored.

The output state 1251 is information representing whether or not the unit information has been output from the respective units. A symbol "O" is stored for a unit of which the unit information has been output, and a symbol "X" is stored for a unit of which the unit information has not been output. As for the velocity sensor unit 70 and the orientation sensor unit 80, since the velocity error thereof is calculated using the detection results from both sensor units, the sensor units are denoted as "velocity/orientation" for simplicity's sake. When the unit information has been output from both sensor units, "O" is stored for them. Therefore, the output state 1251 can be said to be information representing whether or not the present state of each unit is a state where the unit information can be calculated or detected.

For example, a state where all the units of the INS unit 50, the GPS unit 60, and the velocity/orientation sensor units 70 and 80 are outputting the unit information thereof corresponds to "Type A." For example, when the position calculation system 1 is positioned in a place under an open sky and operates without any problem with the respective units, Type A is selected.

A state where the INS unit 50 and the GPS unit 60 are outputting the unit information thereof, but the velocity/orientation sensor units 70 and 80 are not outputting the unit information thereof corresponds to "Type B." For example, a case where the position calculation system 1 is in a state of being able to receive a satellite signal from a GPS satellite, but the velocity/orientation sensor units 70 and 80 are not working properly for some reason corresponds to Type B.

A state where the INS unit 50 and the velocity/orientation sensor units 70 and 80 are outputting the unit information thereof, but the GPS unit 60 is not outputting the unit information thereof corresponds to "Type C." For example, a case where the position calculation system 1 is positioned in a tunnel or a building so that it is unable to receive a GPS satellite signal from a GPS satellite, and only the GPS unit 60 is not outputting (unable to output) the unit information thereof corresponds to Type C.

The Doppler error determination unit 11 identifies the output state 1251 based on the output states of the unit information from the respective units. Moreover, the Doppler error determination unit 11 determines the output type 1253 correlated with the identified output state 1251 by referring to the output type determination table 125.

Figure 5:
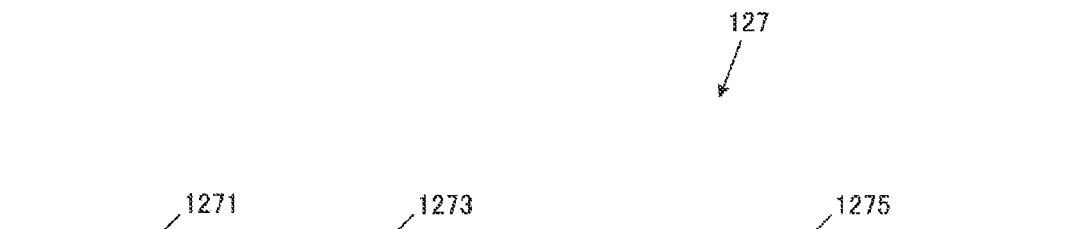
FIG. 5 is a diagram showing an example of the data configuration of weighted-average weighting pattern data.

FIG. 5 is a diagram showing an example of the data configuration of the weighted-average weighting pattern data 127. In the weighted-average weighting pattern data 127, an output type 1271, a movement state 1273, and a weighted-average weighting pattern 1275 are stored so as to be correlated with each other.

The output type 1271 corresponds to the output type 1253 of the output type determination table 125 in FIG. 4. The movement state 1273 is a present movement state of the position calculation system 1, in which a plurality of movement states, for example, "Standstill" representing the system being in a standstill state, "Constant Velocity" representing the system moving in a constant velocity, and "Acceleration/Deceleration" representing the system accelerating or decelerating is stored.

The weighted-average weighting pattern 1275 is a weighting pattern of respective velocity errors used when calculating a weighted average of the velocity error of the INS unit 50, the velocity error of the GPS unit 60, and the velocity error of the velocity/orientation sensor units 70 and 80. That is, a combination of values of a weight "α" for the velocity error of the INS unit 50, a weight "β" for the velocity error of the GPS unit 60, and a weight "γ" for the velocity error of the velocity/orientation sensor units 70 and 80 is determined as the weighted-average weighting pattern. Here, "α+β+γ=1."

When the movement state is "Standstill," the unit information of the velocity/orientation sensor units 70 and 80 is considered to be trustworthy, and the weight "γ" for the velocity error of the velocity/orientation sensor units 70 and 80 is set so as to have a large value. This is because it is considered that in the standstill state, although the detection accuracy of the velocity/orientation sensor units 70 and 80 is high, the calculation accuracy of the INS and GPS units 50 and 60 decreases.

When the movement state is "Constant Velocity," the unit information of the GPS unit 60 is considered to be trustworthy, and the weight 13" for the velocity error of the GPS unit 60 is set so as to have a large value. This is because it is considered that in the constant velocity state, the calculation accuracy of the GPS unit 60 is particularly improved.

Moreover, when the movement state is "Acceleration/Deceleration," the unit information of the INS unit 50 is considered to be trustworthy, and the weight "a" for the velocity error of the INS unit 50 is set so as to have a large value. This is because it is considered that in the acceleration/deceleration state, although the calculation accuracy of the INS unit 50 is improved, the traceability of the GPS unit 60 deteriorates and the calculation accuracy thereof decreases.

However, such a method of setting these weights is merely exemplary and can be appropriately changed.

The Doppler error determination unit 11 determines the present output state 1251 of the respective units and determines the present movement state 1273 of the position calculation system 1 based on the history of the unit information stored in the unit data 121. Moreover, the Doppler error determination unit 11 determines the output type 1253 (1271) corresponding to the determined present output state 1251 of the respective units based on the output type determination table 125. Furthermore, the Doppler error determination unit 11 determines the weighted-average weighting pattern 1275 corresponding to the output type 1271 and the movement state 1273 based on the weighted-average weighting pattern data 127. Furthermore, the Doppler error determination unit 11 calculates an average velocity error by calculating a weighted average of the velocity errors of the respective units calculated by a velocity error calculation process using the determined weighted-average weighting pattern 1275. The average velocity error is a value corresponding to an error in the velocity determined by the position calculation system 1.

Moreover, the Doppler error determination unit 11 acquires information (hereinafter referred to as "satellite information") on the satellite position, satellite velocity, and the like of a GPS satellite from the GPS unit 60 via the second data bus 90 and acquires final aggregate information (hereinafter referred to as "aggregate terminal information") of the position calculation system 1 calculated by the GPA 15. Furthermore, the Doppler error determination unit 11 calculates the direction of the line of sight from the position calculation system 1 to the GPS satellite using the acquired satellite information and aggregate terminal information and calculates the average velocity error in the calculated direction of the line of sight as a Doppler error.

The GPA 15 is a processing unit that calculates an aggregate position and an aggregate velocity which are the final position and velocity of the position calculation system 1 by calculating the aggregate of the positions and velocities output from the various kinds of sensor units using the Kalman filter, for example. The aggregate position and aggregate velocity are the aggregate terminal information. The function of the GPA 15 is realized by a processor, for example, a CPU, a DSP, and the like. The GPA 15 displays the calculated aggregate terminal information on the display unit 30 and outputs the information to the Doppler error determination unit 11. The aggregate velocity is a value corresponding to the velocity determined by the position calculation system 1.

The input unit 20 is an input device which is configured, for example, by a touch panel, a button switch, and the like, and outputs signals of a key and a button pressed by a user to the processing unit 10. Through the operation input from the input unit 20, various instructions such as a position calculation request are input.

The display unit 30 is configured by an LCD (Liquid Crystal Display) and the like and is a display device which performs various display operations based on a display signal input from the processing unit 10. A position display screen, time information, and the like are displayed on the display unit 30.

The communication unit 40 is a communication device for allowing the position calculation system 1 to perform communication with an external device in accordance with control of the processing unit 10. The function of the communication unit 40 is realized, for example, by a wire communication module, a wireless LAN based on IEEE 802.11, a wireless communication module based on a spread spectrum method. Moreover, when the position calculation system 1 is applied to a portable phone, the communication unit 40 may be a communication device for portable phones.

The INS unit 50 is one kind of sensor unit and is an inertial navigation system (position calculation system) which performs a well-known inertial navigation operation process based on the acceleration and angular velocity measured by an IMU (Inertial Measurement Unit) 51 to calculate and detect the position and velocity of the INS unit 50. Moreover, the INS unit 50 calculates errors that may be included in the calculated position and velocity based on the acceleration error and angular velocity error measured by the IMU 51. In the present embodiment, the INS unit 50 calculates the position and velocity in the ENU coordinate system and the position error and velocity error which are the errors thereof on an as-needed basis. Moreover, the INS unit 50 outputs the information on them to the processing unit 10 via the second data bus 90 as the unit information.

The IMU 51 includes an acceleration sensor and a gyro sensor, for example, and is configured to be able to detect an acceleration in each of the directions of the three orthogonal axes of the ENU coordinate system and an angular velocity around each axis. The acceleration sensor and gyro sensor are sensors that measure an acceleration and an angular velocity, respectively. Moreover, the IMU 51 is configured to calculate and output errors that may be included in the measured acceleration and angular velocity on an as-needed basis. For example, a configuration in which the time elapsed from the start of measurement and an error included in the measured value are stored so as to be correlated with each other, and the error corresponding to the time elapsed from the start of measurement is output, a configuration in which the environmental temperature measurement and an error included in the measured value are stored so as to be correlated with each other, and the error corresponding to the present environmental temperature is output, and the like may be considered. The acceleration sensor and gyro sensor may be independent sensors, respectively, and may be an integrated sensor. Moreover, the velocity may be detected and output based on the results of the detection by the acceleration sensor.

The GPS unit 60 is one kind of position calculation unit and performs well-known position calculation computation and velocity calculation computation using a GPS satellite signal transmitted from a GPS satellite which is one kind of positioning satellite. In the present embodiment, the GPS unit 60 calculates the position and velocity in the ECEF coordinate system and the position and velocity errors which are the errors that may be included in the calculation results thereof. Moreover, the GPS unit 60 outputs the information on them to the processing unit 10 via the second data bus 90 as the unit information.

The velocity sensor unit 70 is one kind of sensor unit and is a velocity detection unit having a sensor that detects the moving velocity of the position calculation system 1 and may be any type of sensor, for example, a sensor which uses the Doppler effect, a sensor which uses a spatial filter, and the like. For example, when the position calculation system 1 is applied to an automobile, a vehicle velocity meter mounted on the automobile may be used as the velocity sensor unit 70.

In the present embodiment, the velocity sensor unit 70 outputs a movement velocity in the moving direction of the position calculation system 1 (moving vehicle) and a velocity error that may be included in the movement velocity. For example, the velocity error may be determined based on the time elapsed from the start of measurement or determined so as to be correlated with the environmental temperature measurement and may be output according to the elapsed time and the environmental temperature. The velocity sensor unit 70 outputs the information of them to the processing unit 10 via the second data bus 90 as the unit information.

The orientation sensor unit 80 is one kind of sensor unit and is an orientation detection unit having a biaxial geomagnetic sensor which is configured, for example, by a device of which the resistance and impedance values change with the intensity of a magnetic field.

In the present embodiment, the orientation sensor unit 80 detects the moving direction of the position calculation system 1 (moving vehicle) as an orientation and outputs an orientation error that may be included in the detected orientation. Similarly to the velocity sensor unit 70, for example, the orientation error may be determined based on the time elapsed from the start of measurement or determined so as to be correlated with the environmental temperature measurement and may be output according to the elapsed time and the environmental temperature. The orientation sensor unit 80 outputs the information about them to the processing unit 10 via the second data bus 90 as the unit information.

2. Configuration of GPS Unit

Figure 2:
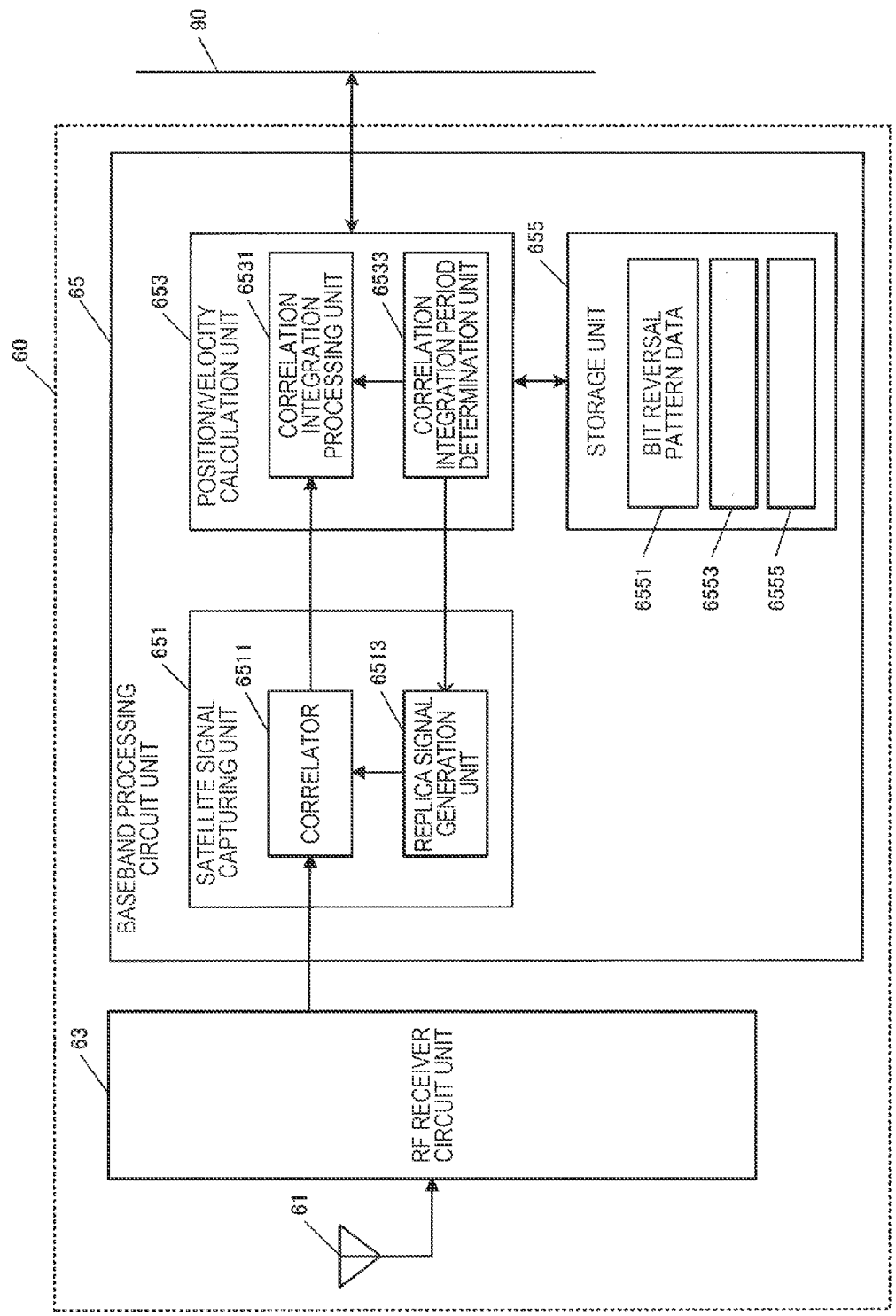
FIG. 2 is a block diagram showing an example of the functional configuration of a GPS unit.

FIG. 2 is a block diagram showing an example of the functional configuration of the GPS unit 60. The GPS unit 60 is configured to include a GPS antenna 61, an RF (Radio Frequency) receiver circuit unit 63, and a baseband processing circuit unit 65.

The GPS antenna 61 is an antenna that receives an RF signal including a GPS satellite signal transmitted from a GPS satellite, and outputs a received signal to the RF receiver circuit unit 63.

The RF receiver circuit unit 63 is an RF signal processing circuit block and down-converts the received RF signal to an intermediate frequency signal (hereinafter referred to as an IF signal) which is subjected to amplification or the like and is then converted to a digital signal by an A/D converter and output to the baseband processing circuit unit 65.

The RF receiver circuit unit 63 and the baseband processing circuit unit 65 constitute a GPS receiving unit. The RF receiver circuit unit 63 and the baseband processing circuit unit 65 may be manufactured as individual LSI (Large Scale Integration) devices, respectively, and may be manufactured as a one-chip device.

The baseband processing circuit unit 65 is a circuit unit that performs a correlation operation process or the like on the IF signal output from the RF receiver circuit unit 63 to capture and extract a GPS satellite signal and performs data decoding to take out a navigation message, time information, and the like. The baseband processing circuit unit 65 is configured to include a satellite signal capturing unit 651, a position/velocity calculation unit 653, and a storage unit 655.

The satellite signal capturing unit 651 is a circuit unit that captures a GPS satellite signal from a received signal which is the IF signal output from the RF receiver circuit unit 63. The satellite signal capturing unit 651 is configured to include a correlator 6511 and a replica signal generation unit 6513.

The correlator 6511 is a correlator that performs a correlation operation between the received signal which is input from the RF receiver circuit unit 63 and converted to the IF signal and a replica signal which is input from the replica signal generation unit 6513. The correlator 6511 outputs correlation values calculated through the correlation operation to the position/velocity calculation unit 653.

The replica signal generation unit 6513 is a circuit unit that generates replica signals of CA codes which are spread codes of the GPS satellite signal. The replica signal generation unit 6513 generates the replica signals while changing the phases thereof according to a correlation integration period output from a correlation integration period determination unit 6533 and outputs the replica signal to the correlator 6511.

The position/velocity calculation unit 653 is a circuit unit that performs well-known position/velocity calculation computation using the GPS satellite signal captured by the satellite signal capturing unit 651 to calculate the position and velocity of the GPS unit 60. The position/velocity calculation unit 653 is configured to include various processing circuit blocks which are a correlation integration processing unit 6531 and a correlation integration period determination unit 6533.

The correlation integration processing unit 6531 is a processing unit that performs a correlation integration process of integrating the correlation values output from the correlator 6511 of the satellite signal capturing unit 651 according to the correlation integration period determined by the correlation integration period determination unit 6533. This processing unit 6531 is realized by a processor, for example, a CPU, a DSP, and the like.

The correlation integration period determination unit 6533 is a processing unit that determines a correlation integration period when the correlation integration processing unit 6531 performs the correlation integration process. The correlation integration period determination unit 6533 is also realized by a processor, for example, a CPU, a DSP, and the like.

The correlation integration period determination unit 6533 acquires the Doppler error determined by the Doppler error determination unit 11 from the processing unit 10 via the second data bus 90. Moreover, the correlation integration period determination unit 6533 calculates and determines the correlation integration period using the acquired Doppler error and outputs the correlation integration period to the correlation integration processing unit 6531.

The storage unit 655 is configured by a storage device such as a ROM, a flash ROM, or a RAM, and stores a system program of the baseband processing circuit unit 65 and various kinds of programs, data, and the like which realize the correlation integration processing function, the position/velocity calculation function. Moreover, the storage unit 655 has work areas in which data being processed for various kinds of processes, processing results, and the like are temporarily stored.

In the storage unit 655, various data are stored, for example, including: bit reversal pattern data 6551, satellite orbit data 6553, and Doppler errors 6555.

The bit reversal pattern data 6551 are data in which the pattern of bit reversals of the CA codes of the received signal. The bit reversal pattern data 6551 can be acquired as assist data from an assist server of the position calculation system 1, for example. When the position calculation system 1 is applied to a portable phone, the bit reversal pattern data 6551 can be acquired as assist data from a base station of the portable phone.

The use of the bit reversal pattern data 6551 enables the correlation integration process to be performed over a longer correlation integration period. The CA codes that modulate the GPS satellite signal are subjected to BPSK modulation every 20 ms with a navigation message. Therefore, when the correlation integration period exceeds 20 ms, polarity reversal of the navigation message takes place so that the values of the CA codes are reversed, and the signs of the correlation values are changed. Thus, there is a problem in that the correlation values may cancel each other during the correlation integration process. However, if the bit reversal pattern of the received signal is known, it is possible to perform integration by rearranging (adjusting) the signs of the correlation values and prevent the correlation values from canceling each other.

The satellite orbit data 6553 are data such as an almanac containing brief satellite orbit information for all GPS satellites and an ephemeris containing detailed satellite orbit information for each of the respective GPS satellites. The satellite orbit data 6553 can be acquired by decoding a GPS satellite signal received from a GPS satellite and can be acquired from a base station and an assist server of a portable phone.

The Doppler error 6555 is a Doppler error which is acquired from the Doppler error determination unit 11 via the second data bus 90.

3. Processing Flow 3-1. Processing of Doppler Error Determination Unit 11

Figure 6:
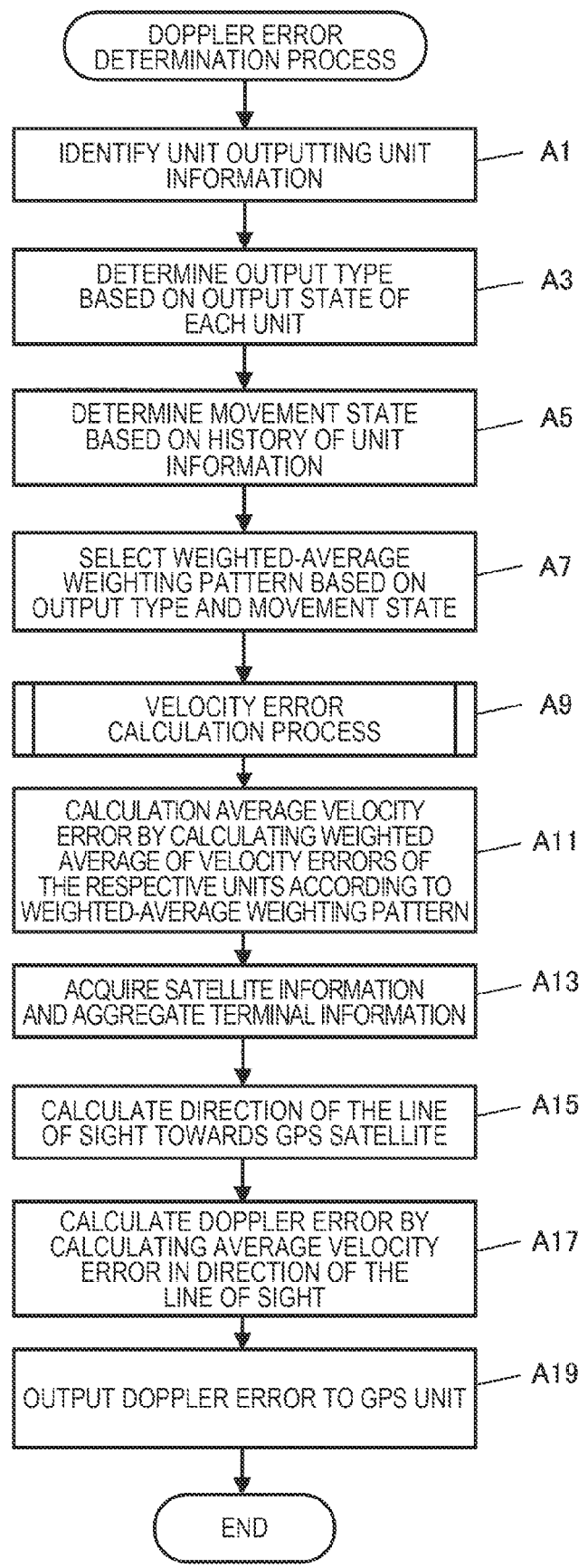
FIG. 6 is a flowchart showing the flow of a Doppler error determination process.

FIG. 6 is a flowchart showing the flow of a Doppler error determination process executed by the Doppler error determination unit 11 of the processing unit 10.

First, the Doppler error determination unit 11 identifies a unit which is outputting the unit information thereof (step A1). Moreover, the Doppler error determination unit 11 determines the output type 1253 correlated with the output state 1251 of the respective units by referring to the output type determination table 125 of the storage unit 12 (step A3).

Subsequently, the Doppler error determination unit 11 determines the movement state 1273 of the position calculation system 1 based on the history of the respective unit information stored in the unit data 121 of the storage unit 12 (step A5). For example, the movement state can be determined as "Standstill" when the velocity in the respective unit information has a value ("0" or near values) corresponding to a standstill state. Moreover, the movement state can be determined as "Constant Velocity" and "Acceleration/Deceleration" when a constant velocity condition (a state where changes over time in the velocity are small lasts for a predetermined period or longer) and an acceleration/deceleration condition (changes over time in the velocity are abrupt) are satisfied, respectively.

When the determination based on the history of the respective unit information results in different determination results, similarly to the weighted-average weighting pattern data 1275 described above, the determination as to "Standstill," "Constant Velocity," and "Acceleration/Deceleration" may be made by applying a weight to the unit information of the velocity/orientation sensor units 70 and 80, the unit information of the GPS unit 60, and the unit information of the INS unit 50, respectively.

The Doppler error determination unit 11 selects the weighted-average weighting pattern 1275 in which the output type 1271 selected in step A3 and the movement state 1273 determined in step A5 are correlated with each other by referring to the weighted-average weighting pattern data 127 of the storage unit 12 (step A7). Moreover, the Doppler error determination unit 11 performs a velocity error calculation process (step A9).

Figure 7:
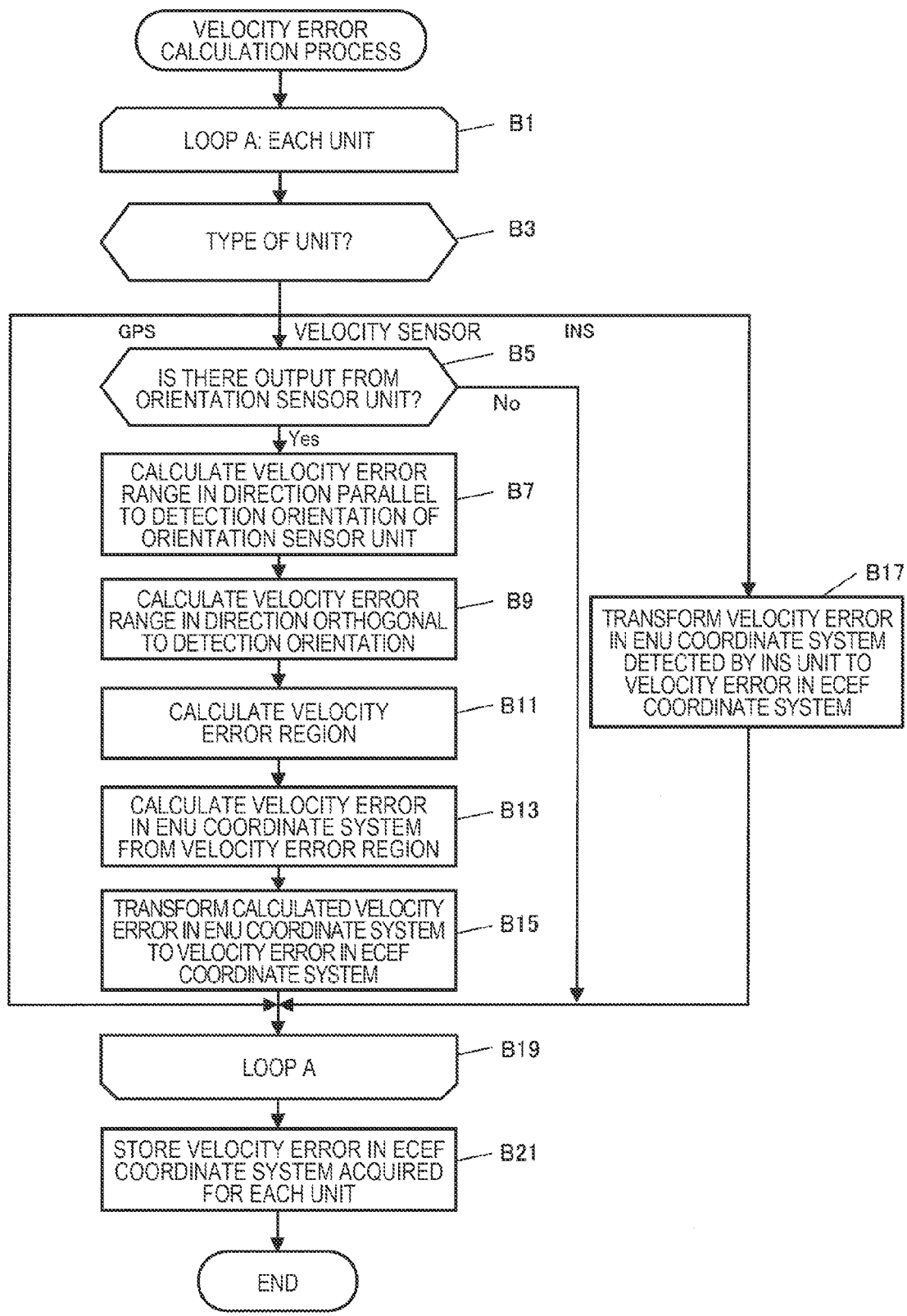
FIG. 7 is a flowchart showing the flow of a velocity error calculation process.

FIG. 7 is a flowchart showing the flow of the velocity error calculation process.

First, the Doppler error determination unit 11 executes the process of the loop A for each of the units determined in step A1 (steps B1 to B19). In the process of the loop A, the Doppler error determination unit 11 identifies the type of the unit (step B3), and when the unit is the GPS unit 60 (step B3: GPS), the flow proceeds to the processing for the next unit. In the present embodiment, since the GPS unit 60 outputs the velocity and velocity error in the ECEF coordinate system, it is not necessary to perform coordinate transformation.

On the other hand, when the unit is a velocity sensor unit 70 (step B3: Velocity Sensor), the Doppler error determination unit 11 determines whether there is an output from the orientation sensor unit 80 (step B5). When the determination result is positive (step B5: Yes), the Doppler error determination unit 11 calculates the velocity error in the ECEF coordinate system using the results of the determination by the velocity sensor unit 70 and the orientation sensor unit 80 (steps B7 to B15).

Figure 8:
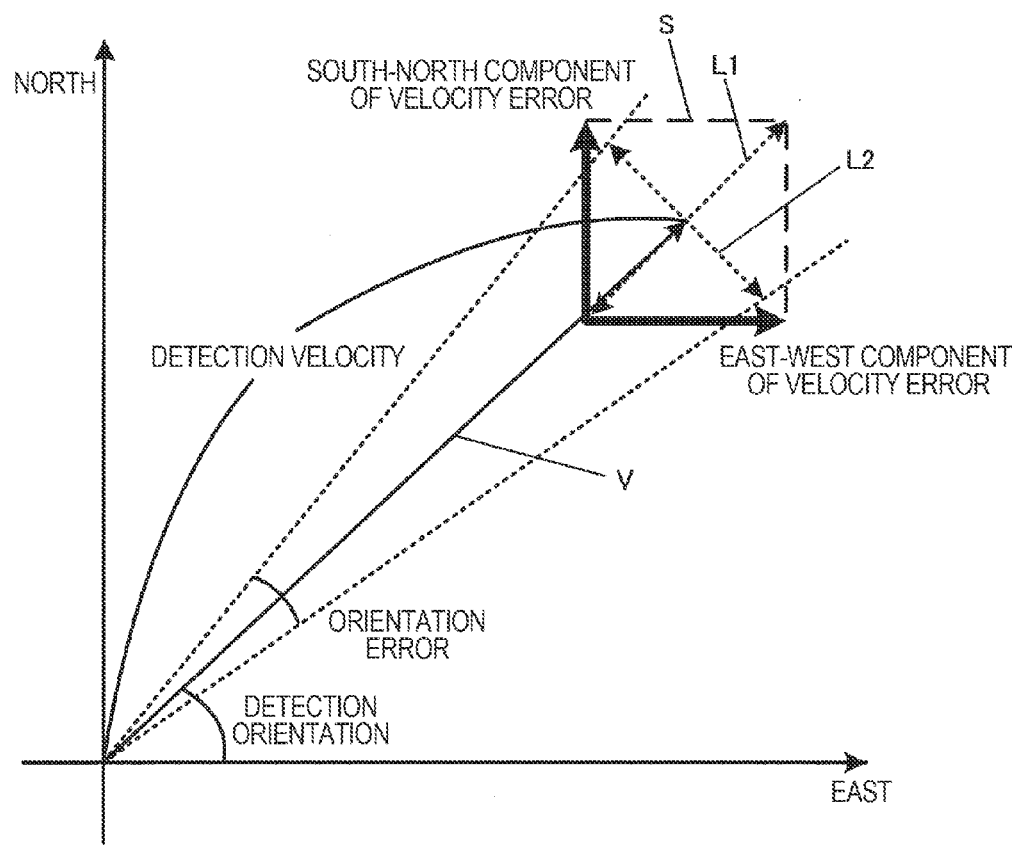
FIG. 8 is a diagram illustrating the principle of calculating a velocity error.

FIG. 8 is a diagram illustrating the principle of calculating the velocity error in the ECEF coordinate system. In FIG. 8, the horizontal axis represents the east-west direction where the east direction is positive, and the vertical axis represents the south-north direction where the north direction is positive. The velocity in the moving direction of a moving vehicle on which the position calculation system 1 is mounted is detected by the velocity sensor unit 70, and the orientation in the moving direction is detected by the orientation sensor unit 80. Here, a velocity vector is defined so that the velocity detected by the velocity sensor unit 70 is the length (magnitude) of the velocity vector, and the detection orientation detected by the orientation sensor unit 80 is the orientation of the velocity vector. The velocity vector V shown in FIG. 8 is defined in this manner.

The error in the detected velocity output from the velocity sensor unit 70 is an error in the direction along the orientation of the velocity vector V, and the error in the detected orientation output from the orientation sensor unit 80 is an error with respect to the orientation (the central angle about the origin of the coordinates of FIG. 8 or the angle with respect to the east-west direction) of the velocity vector V.

Therefore, first, a range L1 of the errors in the detected velocity output from the velocity sensor unit 70 is calculated based on the ending point of the velocity vector V (step B7 in FIG. 7). This range L1 is the range of the errors in the front-rear direction (the front/rear direction of the movement) of the moving vehicle on which the position calculation system 1 is mounted, and will be referred to as a "front-rear velocity error range."

Subsequently, a shift width of the orientation of the velocity vector V corresponding to the range of errors in the detected orientation output from the orientation sensor unit 80 is calculated based on the orientation of the velocity vector V. This shift width is calculated as a range L2 in the direction orthogonal to the orientation of the velocity vector V from the ending point of the velocity vector V (step B9 in FIG. 7). This range L2 is the range of the errors in the left-right direction with respect to the moving direction of the moving vehicle on which the position calculation system 1 is mounted, and will be referred to as a "left-right velocity error range."

Subsequently, a velocity error region S of a square shape of which the diagonal line corresponds to a velocity error range having the larger value among the front-rear velocity error range "L1" and the left-right velocity error range "L2" is calculated (step B11 in FIG. 7). In FIG. 8, Since L1 is larger than L2, a velocity error region S of which the diagonal component corresponds to L1 is calculated. Moreover, the length in the east-west direction of the calculated velocity error region S is calculated as an east-west component (E component) of the velocity error and the length in the south-north direction is calculated as a south-north component (N component) of the velocity error (step B13 in FIG. 7). As for an up-down component (U component) of the velocity error, a fixed value is set, for example. In this way, the velocity error in the ENU coordinate system is calculated.

When the velocity error in the ENU coordinate system is calculated in this way, a coordinate transformation operation is performed to calculate the velocity error in the ECEF coordinate system (step B15 in FIG. 7). Then, the flow proceeds to the processing for the next unit.

On the other hand, when it is determined that the sensor unit is the INS unit 50 (step B5: INS), the Doppler error determination unit 11 performs a coordinate transformation operation to transform the velocity error in the ENU coordinate system detected by the INS unit 50 to the velocity error in the ECEF coordinate system (step B17). Then, the Doppler error determination unit 11 proceeds to perform processing for the next unit.

After the processes of steps B3 to B17 for all of the units are performed, the Doppler error determination unit 11 ends the process of the loop A (step B19). Thereafter, the Doppler error determination unit 11 stores the velocity error in the ECEF coordinate system acquired for the respective units in the storage unit 12 as the velocity/velocity error data 123 (step B21). Then, the Doppler error determination unit 11 ends the velocity error calculation process.

Then, the flow returns to the Doppler error determination process of FIG. 6, and after the velocity error calculation process is performed, the Doppler error determination unit 11 calculates an average velocity error using the velocity error calculated in step A9 by calculating "(Velocity Error of INS Unit 50)×α+" Velocity Error of GPS Unit 60)×β+"(Velocity Error calculated from Velocity/Orientation Sensor Units 70 and 80)×γ" according to the weighted-average weighting pattern selected in step A7 (step A11).

Subsequently, the Doppler error determination unit 11 acquires satellite information from the GPS unit 60 via the second data bus 90 and acquires aggregate terminal information from the GPA 15 (step A13). Then, the Doppler error determination unit 11 calculates the direction of the line of sight from the position calculation system 1 to the GPS satellite using the acquired satellite information and aggregate terminal information (step A15).

Specifically, the Doppler error determination unit 11 calculates an observation matrix "H" according to Equation (1) below using the aggregate terminal position $(X_U, Y_U, Z_U)$ of the position calculation system 1 and the satellite position $(X_{SV}, Y_{SV}, Z_{SV})$ of a capturing target satellite. The observation matrix is a matrix representing the direction of the line of sight from the position calculation system 1 to the GPS satellite.

$$H = \left[\left(\frac{X_U - X_{SV}}{\text{range}}\right), \left(\frac{Y_U - Y_{SV}}{\text{range}}\right), \left(\frac{Z_U - Z_{SV}}{\text{range}}\right)\right] \quad (1)$$

In Equation (1), "range" is a geometric distance between the aggregate terminal position $(X_U, Y_U, Z_U)$ of the position calculation system 1 and the satellite position $(X_{SV}, Y_{SV}, Z_{SV})$ of the GPS satellite and can be expressed as Equation (2) below.

$$\text{range} = \sqrt{(X_U - X_{SV})^2 + (Y_U - Y_{SV})^2 + (Z_U - Z_{SV})^2} \quad (2)$$

Subsequently, the Doppler error determination unit 11 calculates a Doppler error by calculating an average velocity error in the direction of the line of sight calculated in step A15 (step A17). Specifically, a Doppler error "σ" is calculated according to Equation (3) below using the observation matrix "H" calculated in step A15.

$$\sigma = \sqrt{H^2 * \begin{bmatrix} U_\sigma^2 \\ V_\sigma^2 \\ W_\sigma^2 \end{bmatrix}} \quad (3)$$

In Equation (3), "$(U_\sigma, V_\sigma, W_\sigma)$" each is an average velocity error in each axial direction of the ECEF coordinate system.

Subsequently, the Doppler error determination unit 11 outputs the Doppler error "a" calculated in step A17 to the GPS unit 60 (step A19). Then, the Doppler error determination unit 11 ends the Doppler error determination process.

3-2. Processing of GPS Unit 60

Figure 9:
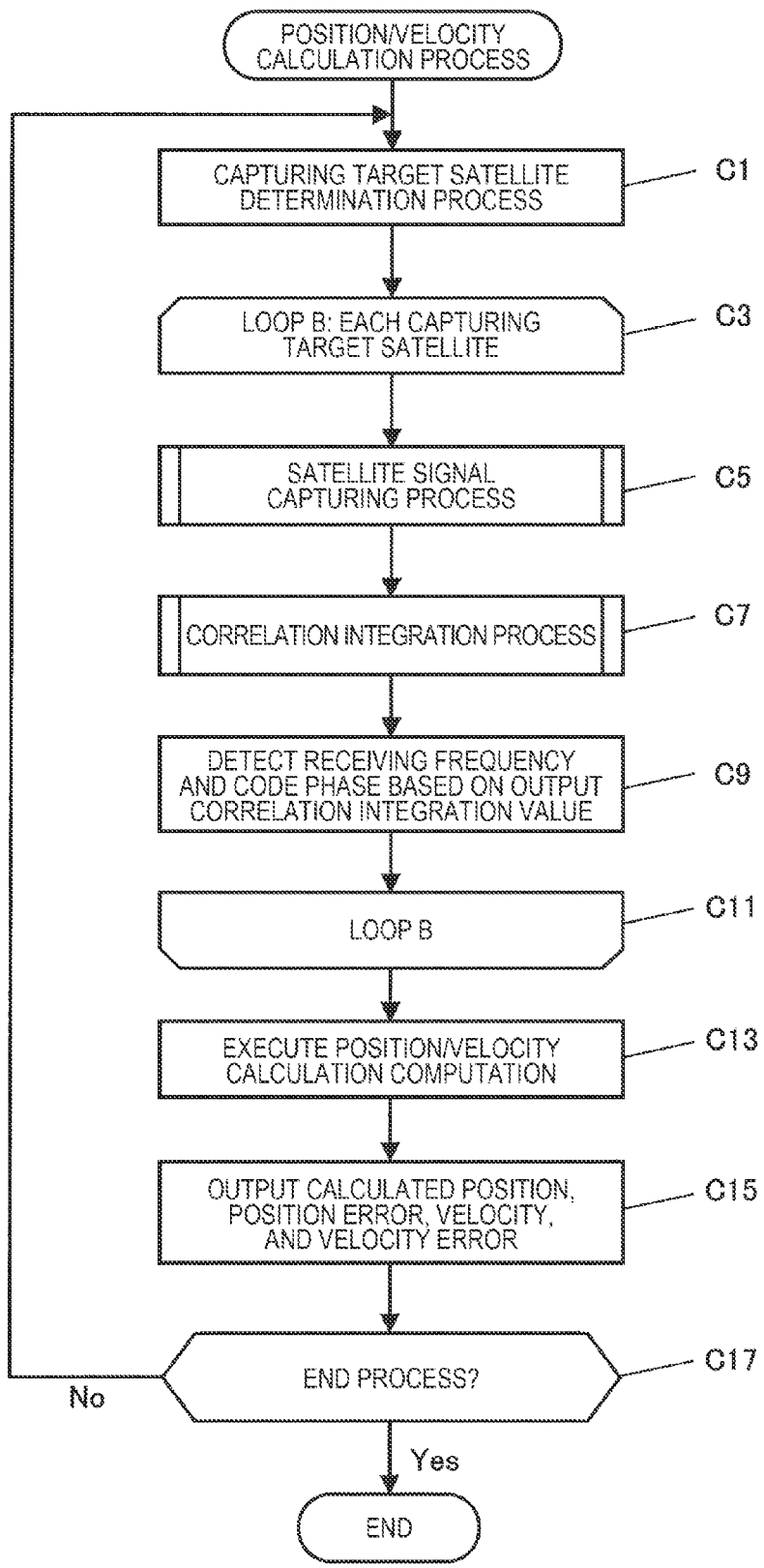
FIG. 9 is a flowchart showing the flow of a position/velocity calculation process.

FIG. 9 is a flowchart showing the flow of a position/velocity calculation process executed by the position/velocity calculation unit 653 of the GPS unit 60.

First, the position/velocity calculation unit 653 performs a capturing target satellite determination process (step C1). Specifically, at a present time which is measured by a timer unit (not shown), a GPS satellite located in the sky at a predetermined reference position is identified using the satellite orbit data 6553 of the storage unit 655 and is used as a capturing target satellite. For example, the reference position can be set by a method in which the position acquired from an assist server through so-called server assist is used as the reference position when the first position calculation is performed after power-on, and the latest aggregate terminal position is used as the reference position when the second position calculation or later is performed.

Subsequently, the position/velocity calculation unit 653 executes the process of the loop B for the respective capturing target satellites determined in step C1 (steps C3 to C11). In the process of the loop B, the position/velocity calculation unit 653 performs a satellite signal capturing process (step C5).

Figure 10:
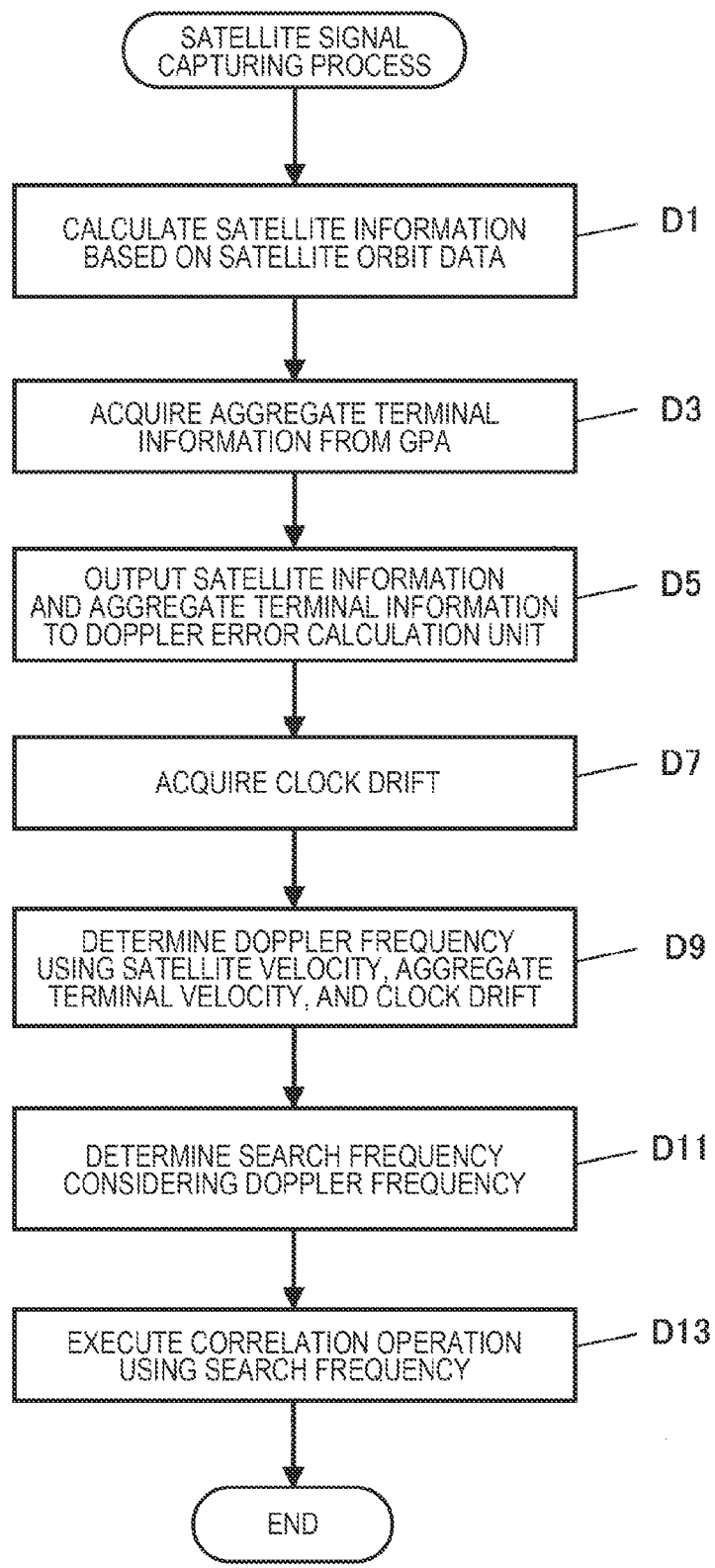
FIG. 10 is a flowchart showing the flow of a satellite signal capturing process.

FIG. 10 is a flowchart showing the flow of the satellite signal capturing process.

First, the position/velocity calculation unit 653 calculates satellite information (satellite position and satellite velocity) of the capturing target satellite based on the satellite orbit data 6553 stored in the storage unit 655 (step D1). Moreover, the position/velocity calculation unit 653 acquires aggregate terminal information (aggregate terminal position and aggregate terminal velocity) from the GPA 15 (step D3).

Subsequently, the position/velocity calculation unit 653 outputs the satellite information and the aggregate terminal information acquired in steps D1 and D3 to the Doppler error determination unit 11 (step D5). This is to enable the Doppler error determination unit 11 to calculate the direction of the line of sight towards the capturing target satellite.

Moreover, the position/velocity calculation unit 653 acquires a drift of a clock provided in the GPS unit 60 (step D7). Then, the position/velocity calculation unit 653 determines a Doppler frequency of the capturing target satellite using the satellite velocity, the aggregate terminal velocity, and the clock drift (step D9). Since a method for calculating the Doppler frequency is well known in the related art, description thereof will be omitted here.

Subsequently, the position/velocity calculation unit 653 determines a search frequency used for searching the frequency of the capturing target satellite while considering the Doppler frequency determined in step D9 (step D11). Specifically, a frequency calculated by adding the Doppler frequency to the carrier frequency of the GPS satellite signal is determined as the search frequency.

Thereafter, the position/velocity calculation unit 653 causes the satellite signal capturing unit 651 to capture the GPS satellite signal of the capturing target satellite using the determined search frequency (step D13). Then, the position/velocity calculation unit 653 ends the satellite signal capturing process.

Then, the flow returns to the position/velocity calculation process of FIG. 9, and after the satellite signal capturing process is performed, the correlation integration processing unit 6531 performs a correlation integration process (step C7).

Figure 11:
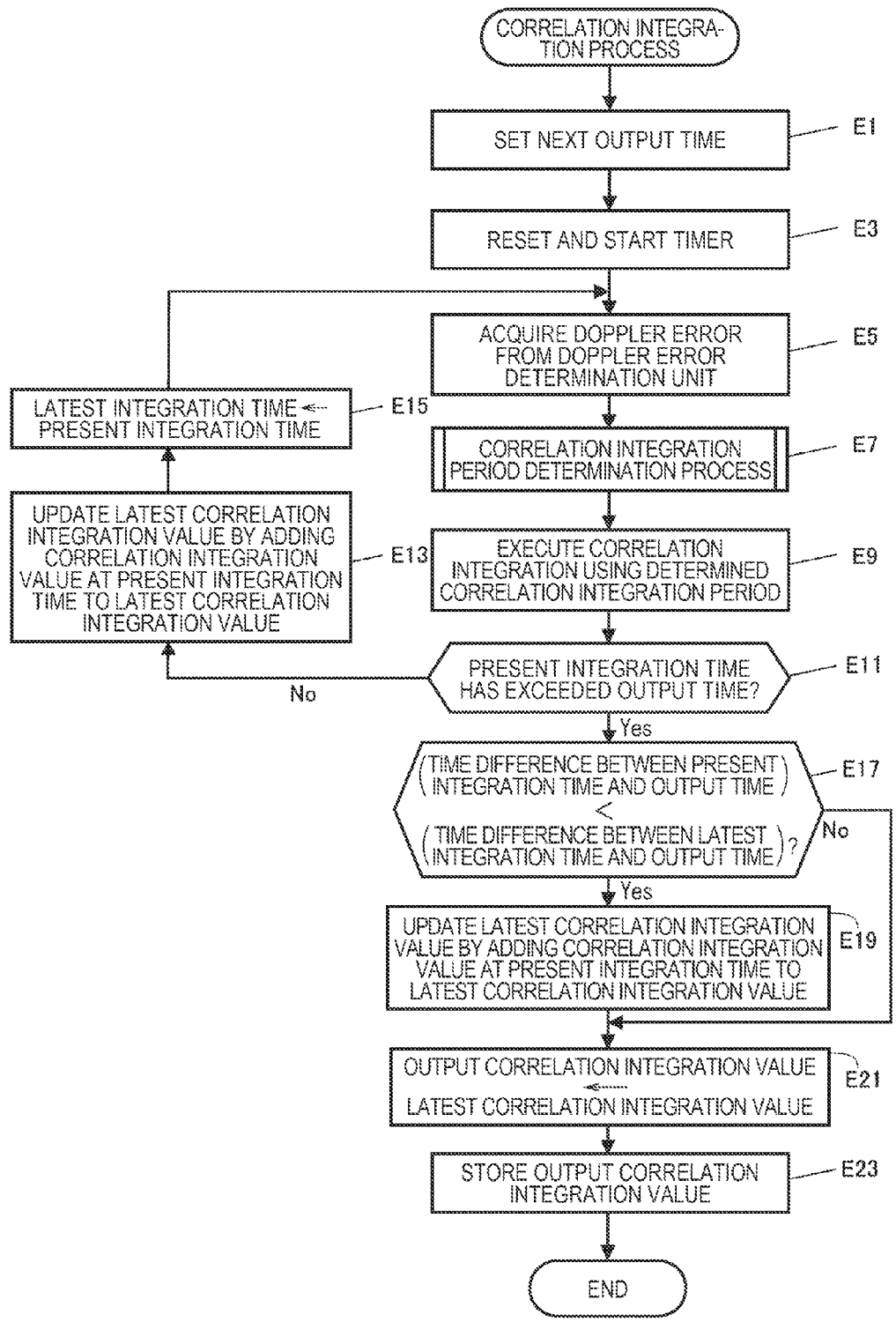
FIG. 11 is a flowchart showing the flow of a correlation integration process.

FIG. 11 is a flowchart showing the flow of the correlation integration process.

First, the correlation integration processing unit 6531 sets the next output time of the correlation integration value (step E1). The next output time can be set to an arbitrary time (for example, a time 4 seconds elapsed from the start of the correlation integration). Then, the correlation integration processing unit 6531 resets and starts an internal timer (step E3).

Subsequently, the correlation integration period determination unit 6533 acquires the Doppler error from the Doppler error determination unit 11 via the second data bus 90 (step E5). Then, the correlation integration period determination unit 6533 performs a correlation integration period determination process (step E7).

Here, the principle of a method of determining the correlation integration period in the present embodiment will be described. The present inventor conducted experiments to calculate the relationship between the Doppler error, the correlation integration value, and the correlation integration period.

Figure 12:
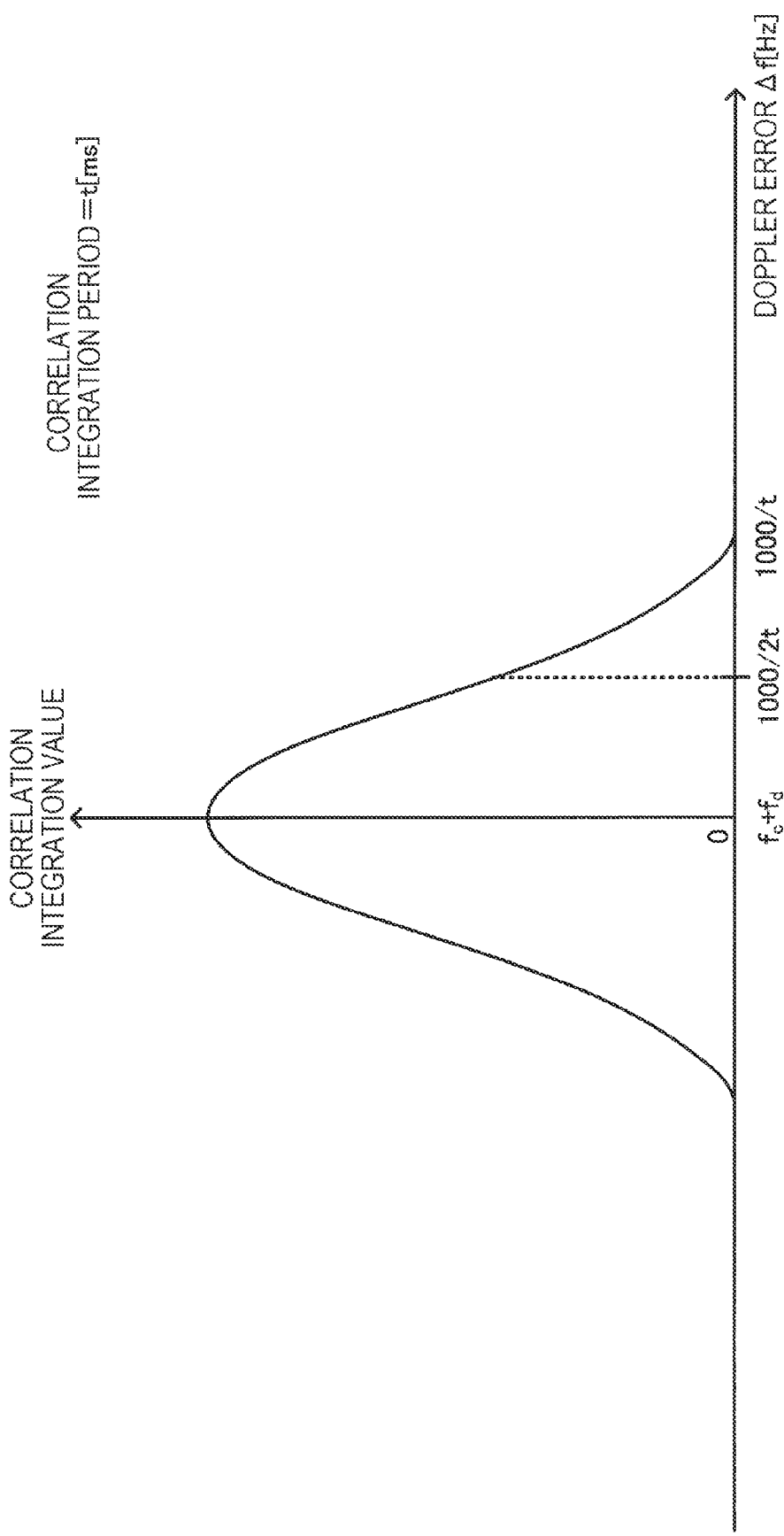
FIG. 12 is a diagram illustrating the principle of determining correlation integration period.

FIG. 12 is a diagram showing the relationship between the Doppler error, the correlation integration value, and the correlation integration period calculated from the experiment results and is a graph showing the changes in the correlation integration value when the correlation values were integrated over a correlation integration period of t (ms). When there is no Doppler error $\Delta f$ ($\Delta f = 0$), since there is no variation in the Doppler frequency $f_d$, the actual search frequency (=[carrier frequency $f_c$]+[Doppler frequency $f_d$]) will not vary. However, when there is a Doppler error $\Delta f$ ($\Delta f \neq 0$), since the Doppler frequency $f_d$ will be different from an intended frequency, the actual search frequency will be a frequency which is changed from an intended search frequency.

When the correlation values are integrated, the correlation values corresponding to the frequencies are integrated. If the integration is performed when there is a Doppler error Δf (Δf≠0), the frequency used as the reference during the integration will not be correct. As a result, the peak value of the final correlation integration value calculated through the integration will decrease to be lower than an expected value. The decrease in the peak value of the correlation integration value is remarkable as the magnitude of the Doppler error Δf increases. This is as shown in the graph of FIG. 12.

On the other hand, the same can be applied to the correlation integration period t. When there is a Doppler error Δf (Δf≠0), the decrease in the peak value of the final correlation integration value is remarkable as the length of the correlation integration period t increases. Although it is not clearly illustrated in FIG. 12, this can be understood from the relationship between the Doppler error Δf and the correlation integration period t when the correlation integration value (peak value) becomes "0."

That is, the Doppler error Δf when the correlation integration value is "0" is calculated as 1000/t. The Doppler error Δf decreases as the correlation integration period t increases. This means that the peak value of the final correlation integration value decreases abruptly (quickly approaches "0") as the correlation integration period t increases. Therefore, if the correlation integration is performed with the correlation integration period t set to be long in a state where there is a small Doppler error, it will be difficult to detect the peak of the correlation integration value.

For this reason, it can be considered to be appropriate to set the correlation integration period t so as to be long when the Doppler error Δf is small while setting the correlation integration period t so as to be short when the Doppler error Δf is large. Therefore, in the present embodiment, the correlation integration period t is calculated according to Equation (4) below using the Doppler error Δf.

$$t[ms] = \frac{1000}{2\Delta f[Hz]} \quad (4)$$

According to Equation (4), the correlation integration period t decreases as the Doppler error Δf increases. The correlation integration period t is calculated using a value 2Δf that is twice the Doppler error. The reason of this is because it is considered to be difficult to detect the peak of the correlation integration value when the correlation integration period is determined as t=1000/Δf since the boundary of the Doppler error at which the peak of the correlation integration value (peak value) is not observable is given as Δf=1000/t as shown in FIG. 12.

Returning to the description of FIG. 11, when the correlation integration period is determined in this way, the correlation integration processing unit 6531 executes correlation integration of integrating the correlation values output from the correlator 6511 with the determined correlation integration period t (step E9). Then, the correlation integration processing unit 6531 determines whether or not the time (hereinafter referred to as a "present integration time") at which the present correlation values are integrated has exceeded an output time (step E11).

When it is determined in step E11 that the present integration time has not exceeded the output time (step E11: No), the correlation integration processing unit 6531 updates a latest correlation integration value by adding the correlation integration value at the present integration time to a newest correlation integration value (hereinafter referred to as a "latest correlation integration value") (step E13). After the latest integration time is updated with the present integration time (step E15), the flow returns to step E5.

On the other hand, when it is determined in step E11 that the present integration time has exceeded the output time (step E11: Yes), the correlation integration processing unit 6531 determines whether or not a time difference between the present integration time and the output time is smaller than a time difference between the latest integration time and the output time (step E17).

When it is determined to be smaller (step E17: Yes), the correlation integration processing unit 6531 updates the latest correlation integration value by adding the correlation integration value at the present integration time to the latest correlation integration value (step E19). Then, the correlation integration processing unit 6531 updates a correlation integration value to be output (hereinafter referred to as an "output correlation integration value") with the latest correlation integration value (step E21). Then, the output correlation integration value is stored in the storage unit 655 (step E23), and the correlation integration process ends.

Then, the flow returns to the position/velocity calculation process of FIG. 9, and after the correlation integration process is performed, the position/velocity calculation unit 653 detects the receiving frequency and code phase based on the output correlation integration value calculated through the correlation integration process (step C9). Then, the position/velocity calculation unit 653 proceeds to perform processing for the next capturing target satellite.

After the processes of steps C5 to C9 for all of the capturing target satellites are performed, the position/velocity calculation unit 653 ends the process of the loop B (step C11). Thereafter, the position/velocity calculation unit 653 executes position/velocity calculation computation to calculate the position and velocity of the position calculation system 1 and the position error and velocity error thereof (step C13).

The position calculation computation can be realized by a well-known convergence operation which uses the method of least squares or the Kalman filter, for example, using a pseudo-range between the position calculation system 1 and the capturing target satellite, for example. Moreover, the velocity calculation computation can be realized similarly based on a well-known method using the changes over time in the receiving frequency of the GPS satellite signal received from the capturing target satellite, for example.

Then, the position/velocity calculation unit 653 outputs the calculated position, position error, velocity, and velocity error to the processing unit 10 via the second data bus 90 (step C15). Then, the position/velocity calculation unit 653 determines whether or not to end the process (step C17), and when the process is determined not to be ended (step C17: No), the flow returns to step C1.

Moreover, when the process is determined to be ended (step C17: Yes), the position/velocity calculation unit 653 ends the position/velocity calculation process.

3-3. Processing of GPA 15

Figure 13:
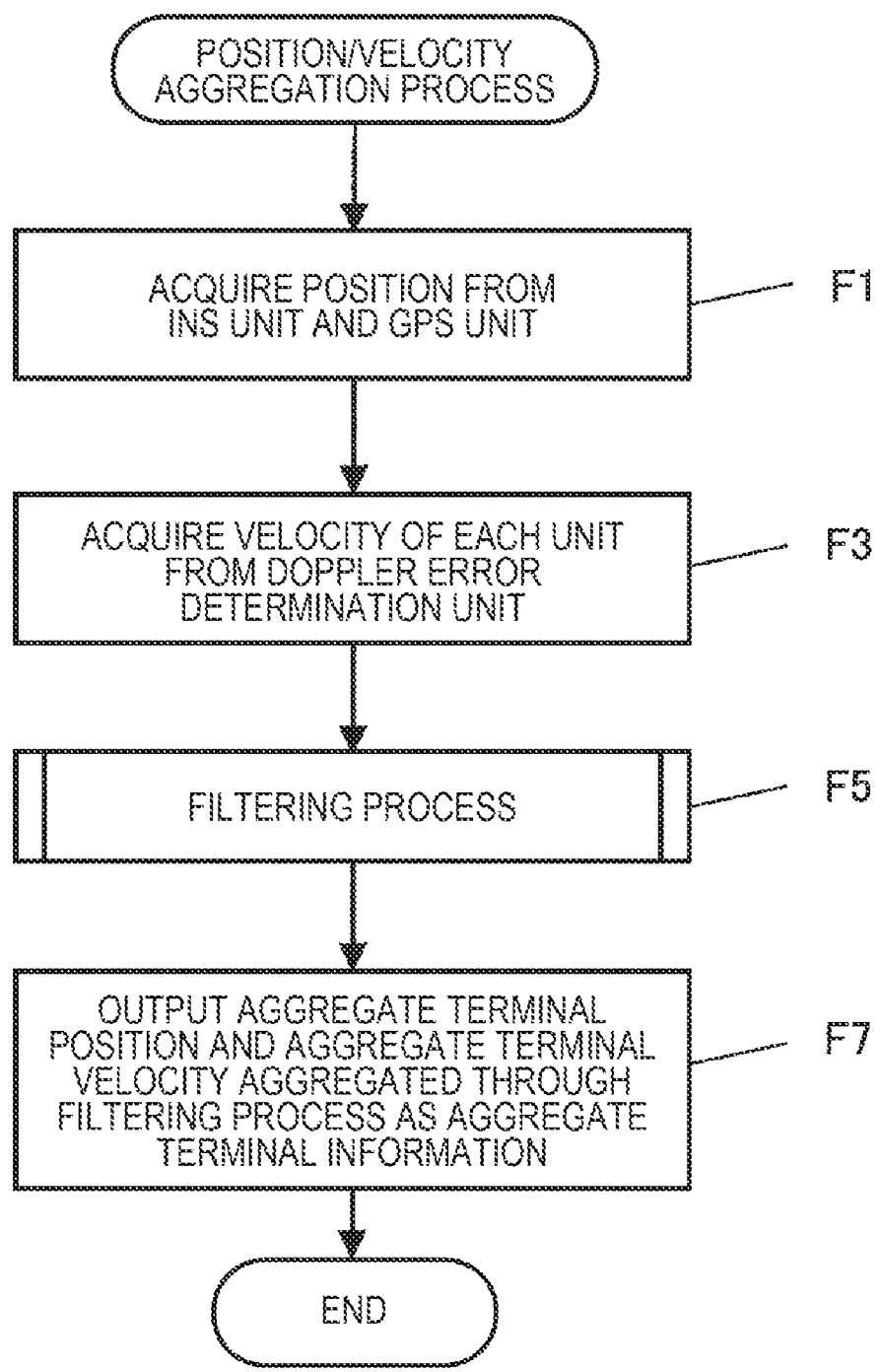
FIG. 13 is a flowchart showing the flow of a position/velocity aggregation process.

FIG. 13 is a flowchart showing the flow of a position/velocity aggregation process executed by the GPA 15.

First, the GPA 15 acquires the position information from the INS unit 50 and the GPS unit 60 via the second data bus 90 (step F1). Moreover, the GPA 15 acquires the velocity information of the respective units from the Doppler error determination unit 11 (step F3).

Subsequently, the GPA 15 performs a filtering process on the positions and velocities acquired in steps F1 and F3 (step F5). In the present embodiment, a process of aggregating the positions and velocities using the Kalman filter is executed as a filtering process.

Specifically, the position and velocity of the INS unit 50 are set as a state (state vector) "X" in the Kalman filter. Moreover, the position and velocity acquired from the GPS unit 60 and the velocity calculated from the velocity/orientation sensor units 70 and 80 are set as observation values "Z" which are external observation quantities in the Kalman filter. Then, a prediction operation of predicting the state "X" and a correction operation of correcting the predicted state "X" using the observation values "Z" are performed. Then, the position and velocity included in the state "X" corrected by the correction operation are determined as the aggregated terminal position and aggregated velocity.

Subsequently, the GPA 15 outputs the aggregated terminal position and aggregated velocity aggregated by the filtering process to the Doppler error determination unit 11 as aggregate terminal information and outputs the same to the GPS unit 60 via the second data bus 90 (step F7). Then, the GPA 15 ends the position/velocity aggregation process.

4. Functions and Advantages

In the position calculation system 1, the velocities calculated by the INS unit 50 and the GPS unit 60 and the velocities detected by the velocity/orientation sensor units 70 and 80 which are one kind of sensor unit are aggregated by the GPA 15, whereby the velocity of the position calculation system 1 is calculated. Moreover, the Doppler error is determined by the Doppler error determination unit 11 using the velocity errors calculated by the INS unit 50 and the GPS unit 60 and the velocity errors detected by the velocity/orientation sensor units 70 and 80.

In the GPS unit 60, the Doppler frequency is determined using the velocity determined by the GPA 15, and the correlation integration period used when the correlation process is performed is determined using the Doppler error determined by the Doppler error determination unit 11. The positions calculated by the INS unit 50 and the GPS unit 60 are aggregated by the GPA 15, whereby the position of the position calculation system 1 is calculated.

Since the position calculation system 1 is moving, the Doppler effect accompanied by the movement cannot be ignored. Although the Doppler frequency in that instance can be predicted using the velocity of the position calculation system 1, the predicted Doppler frequency varies according to the movement state or the like of the position calculation system 1. In the present embodiment, the variation of the Doppler frequency is calculated as the Doppler error using the velocity error of the position calculation system 1. Moreover, the correlation integration period is determined using the calculated Doppler error. In this way, it is possible to determine an appropriate correlation integration period while considering the changes in the Doppler frequency and to perform the correlation process.

More specifically, the weighted-average weighting pattern which is the weighting pattern used when calculating the weighted average of the velocity errors of the respective units is selected based on the output state of the unit information from the respective units and the movement state of the position calculation system 1. Moreover, the average velocity error is calculated by calculating the weighted average of the velocity errors from the respective units using the selected weighted-average weighting pattern. Then, the direction of the line of sight towards the GPS satellite transmitting the GPS satellite signal is calculated, and the average velocity error in the calculated direction of the line of sight is calculated as the Doppler error.

The unit information that is to be weighted and trusted among the respective unit information output from the respective units may change depending on a factor, whether or not each unit is in a state of being able to detect/output the unit information, and a factor, the movement state of the position calculation system 1. Therefore, a more accurate Doppler error can be calculated by calculating the weight average while varying the weights of the velocity errors of the respective units according to these factors.

For example, when the position calculation system 1 is located under an environment such as in a tunnel where it is unable to receive the GPS satellite signal, it is unable to use the unit information of the GPS unit 60. Therefore, velocity calculation accuracy decreases, and the velocity error increases gradually. In this case, since the Doppler error increases, the correlation integration period decreases according to Equation (4). However, as shown in FIG. 12, if the correlation integration period decreases, it is possible to detect the peak of the correlation integration value even when the Doppler error has a large value. Therefore, when the position calculation system 1 emerges from the tunnel and returns to a state of being able to receive the GPS satellite signal, it is possible to capture the GPS satellite signal in a quick and appropriate manner.

Moreover, in the correlation integration process, the GPS unit 60 performs the correlation process by using the time at which the correlation integration period elapses as the integration time and summing the correlation integration value at each integration time. Moreover, when the present integration time exceeds the output time (for example, every four seconds) of the correlation integration value, the GPS unit 60 determines the magnitude relationship between the time difference between the present integration time and the output time and the time difference between the previous integration time and the output time and determines the integration time having the smaller time difference as the ending time of the summing of the correlation integration value.

In the present embodiment, since the correlation integration period is determined using the Doppler error, the correlation integration period has a fluctuating value rather than a constant value. For this reason, the output time of a beforehand predetermined correlation integration value is not always identical to the integration time of the correlation integration period. Thus, the integration time closest to the output time of the correlation integration value is adjusted so as to be the ending time of the summing of the correlation integration value.

Although the present embodiment has been described by defining the variation of the Doppler frequency as "Doppler error," the variation of the Doppler frequency may be defined as "Doppler accuracy" in the sense of the accuracy of the Doppler frequency. Other "errors" can be similarly rephrased as "accuracies."

5. Modification 5-1. Kinds of Unit

The units which can be mounted on the position calculation system 1 are not limited to the above-described units. For example, a sensor unit such as an acceleration sensor unit or a gyro sensor unit can be incorporated as a sensor unit capable of detecting a physical event which can be used for calculating the position and velocity. Moreover, a unit that detects the position using an RFID (Radio Frequency IDentification) can be incorporated as a position detection unit.

Figure 14:
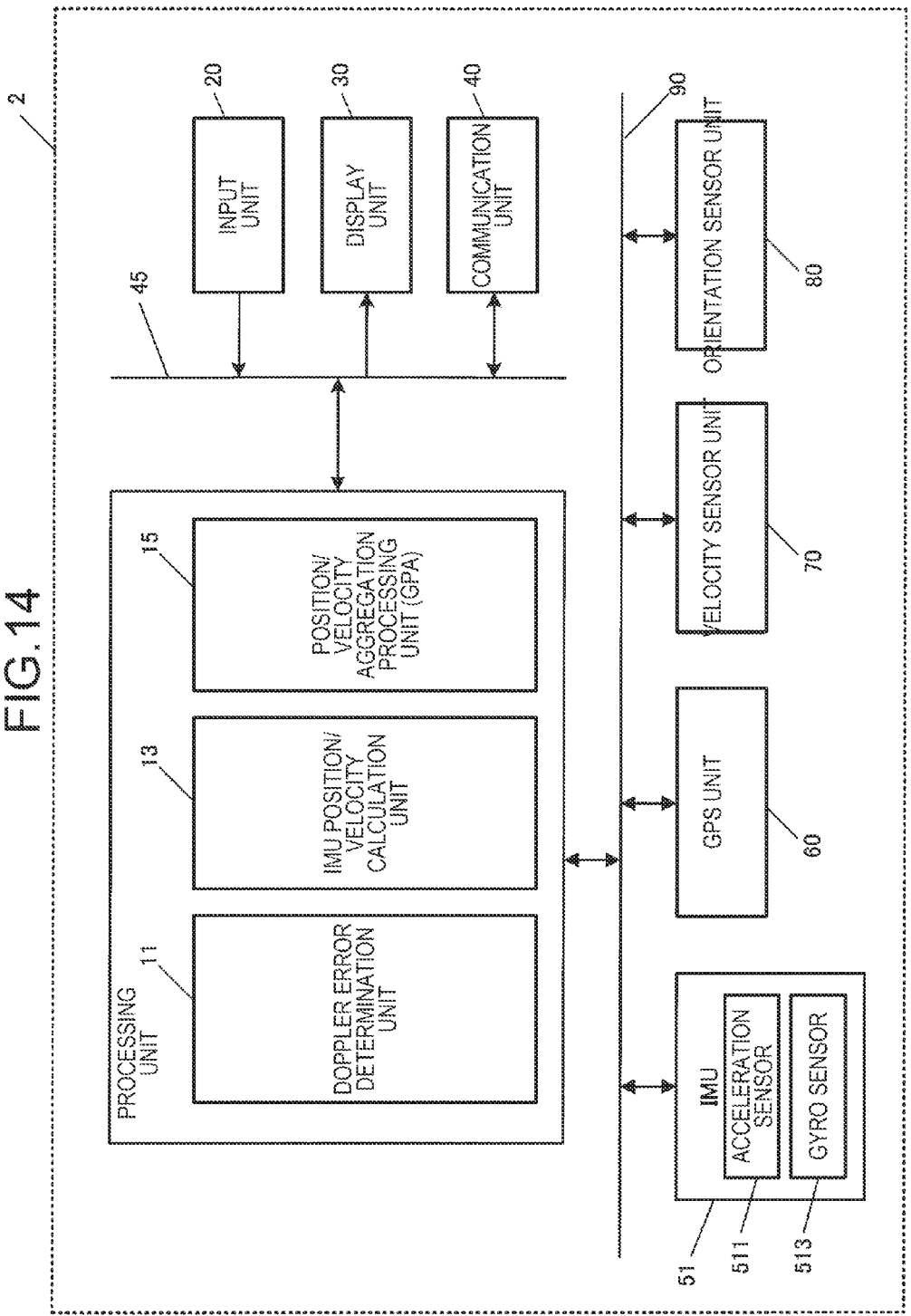
FIG. 14 is a block diagram showing an example of the functional configuration of a position calculation system according to a modification.

FIG. 14 is a block diagram showing an example of the configuration of a position calculation system 2 according to this modification. The position calculation system 2 is a system on which the IMU 51 is mounted in place of the INS unit 50. In FIG. 14, the same constituent elements as the embodiment described above will be denoted by the same reference numerals as FIG. 1, and detailed description thereof will be omitted.

In the position calculation system 2, the IMU 51 is provided in place of the INS unit 50. Moreover, an IMU position/velocity calculation unit 13 that calculates the position and velocity and the position and velocity errors using the unit information output from the IMU 51 is provided in the processing unit 10. In this case, the Doppler error determination unit 11 calculates and determines the Doppler error using the velocity error calculated by the IMU position/velocity calculation unit 13, the velocity error calculated by the GPS unit 60, and the velocity error calculated from the results of the detection by the velocity/orientation sensor units 70 and 80. Moreover, the position/velocity aggregation processing unit 15 calculates the aggregate terminal information by aggregating the position and velocity output from the GPS unit 60, the velocities output from the velocity/orientation sensor units 70 and 80, and the position and velocity calculated by the IMU position/velocity calculation unit 13.

The velocity sensor unit 70 and the orientation sensor unit 80 may be omitted, and the Doppler error may be calculated using the velocity error calculated by the IMU position/velocity calculation unit 13 and the velocity error calculated by the GPS unit 60. Moreover, in this case, the aggregate terminal information is calculated by aggregating the position and velocity calculated by the IMU position/velocity calculation unit 13 and the position and velocity calculated by the GPS unit 60.

5-2. Coordinate System of Unit

In the embodiment described above, the ENU coordinate system is assigned to the INS unit 50 as the calculation coordinate system, and the ECEF coordinate system is assigned to the GPS unit 60 as the calculation coordinate system. However, this assignment of the coordinate system may be changed appropriately. For example, the INS unit 50 may be designed so as to calculate the position and velocity in the ECEF coordinate system. In any case, the position and velocity can be calculated by unifying the coordinate system through a coordinate transformation operation.

5-3. Changing Weighted-Average Weighting According to Relative Value between Velocity Errors The weight used for calculating the weighted average of the velocity errors may be changed according to relative values between the velocity error of the INS unit 50, the velocity error of the GPS unit 60, the velocity errors of the velocity/orientation sensor units 70 and 80.

FIG. 15 is a diagram showing an example of the data configuration of weighted-average weighting pattern data applicable to this case. In addition, for simplification of the description, illustration of the output type of each unit is omitted, and the weighted-average weighting patterns of individual movement states are illustrated.

In this weighted-average weighting pattern data, the weighting pattern is defined such that a value obtained by multiplying a parameter value which is normalized with the velocity error of each unit by a value which is determined in advance for each unit is used as a weight. In this regard, the velocity error of the INS unit 50 is expressed as "$\sigma i$," and the velocity error of the GPS unit 60 as "$\sigma g$" and the weight for the velocity/orientation sensor units 70 and 80 as "$\sigma s$." A more accurate Doppler error can be calculated by setting the weighted-average weights while considering the relative values between the velocity errors of the respective units.

5-4. Calculation of Doppler Error

In the embodiment described above, the average velocity error is calculated by calculating the weighted average of the velocity errors of the respective units, and the Doppler error is calculated using the average velocity error. However, this Doppler error calculation method is merely an example.

For example, the average velocity error may be calculated using a simple arithmetical average rather than the weighted average, and the Doppler error may be calculated using the average velocity error. Moreover, a velocity error that is the smallest among the velocity errors output from the respective units may be selected, and the Doppler error may be calculated using the selected velocity error.

5-5. Determination of Correlation Integration Period

In the embodiment described above, the correlation integration period is calculated according to Equation (4). However, a table determining the correspondence between the Doppler error and the correlation integration period may be prepared as shown in FIG. 16, for example. Then, the correlation integration period may be determined by reading a correlation integration period from the table, which is correlated with the Doppler error determined by the Doppler error determination unit 11.

5-6. Position/Velocity Aggregation Process

In the embodiment described above, in the position/velocity aggregation process executed by the GPA 15, the filtering process is performed using the Kalman filter in which the results of the calculation by the GPS unit 60 are used as the observation values. However, the filtering process may be performed using the Kalman filter in which the results of the calculation by the INS unit 50 are used as the observation values.

5-7. Filtering Process

Moreover, in the embodiment described above, an example where the position is calculated by a filtering process which uses the Kalman filter has been described. However, the filter being used may be a Particle filter, a Sigma point filter, a least square filter, and the like, and the positions/velocities may be aggregated through a filtering process which uses these filters.

5-8. Position Calculation Unit

Moreover, in the embodiment described above, although a GPS unit is used as the position calculation unit, the position calculation unit may use other satellite positioning systems such as WAAS (Wide Area Augmentation System), QZSS (Quasi Zenith Satellite System), GLONASS (GLObal NAvigation Satellite System), or GALILEO.

The entire disclosure of Japanese Patent Application No. 2009-288180, filed on Dec. 18, 2009 is expressly incorporated by reference herein.

What is claimed is:

1. A method for calculating a position of a moving vehicle using a first unit that performs a correlation process on a satellite signal received from a satellite to capture the satellite signal and calculate the position and velocity of the moving vehicle and a second unit capable of detecting at least the velocity of the moving vehicle, the method comprising:

calculating a determination velocity which is the velocity determined using the results of the calculation by the first unit and the results of the detection by the second unit;

calculating an error in the determination velocity using an error in the calculation by the first unit and an error in the detection by the second unit, wherein the calculating of the error in the determination velocity includes calculating a weighted average of the error in the calculation by the first unit and the error in the detection by the second unit;

determining a Doppler frequency which is used when the first unit determines the frequency used for searching for the satellite signal using the determination velocity;

determining a correlation integration period used when the first unit performs the correlation process using the error in the determination velocity; and calculating the position of the moving vehicle using the results of the calculation by the first unit and the results of the detection by the second unit.

2. The method according to claim 1,
wherein the calculating of the weighted average includes changing the weight used for calculating the weighted average according to a movement state.

3. The method according to claim 1,
wherein the calculating of the weighted average includes changing the weight used for calculating the weighted average according to whether or not the first unit is in a state of being able to calculate the position and whether or not the second unit is in a state of being able to perform the detection.

4. The method according to claim 1,
wherein the calculating of the weighted average includes changing the weight used for calculating the weighted average according to relative values between the error in the calculation by the first unit and the error in the detection by the second unit.

5. A method for calculating a position of a moving vehicle using a first unit that performs a correlation process on a satellite signal received from a satellite to capture the satellite signal and calculate the position and velocity of the moving vehicle, wherein the first unit is a unit that performs the correlation process by summing correlation integration values each time the correlation integration period elapses and performs a process of calculating the position through the correlation process every predetermined interval of time, and a second unit capable of detecting at least the velocity of the moving vehicle, the method comprising:

calculating a determination velocity which is the velocity determined using the results of the calculation by the first unit and the results of the detection by the second unit;

calculating an error in the determination velocity using an error in the calculation by the first unit and an error in the detection by the second unit;

determining a Doppler frequency which is used when the first unit determines the frequency used for searching for the satellite signal using the determination velocity;

determining a correlation integration period used when the first unit performs the correlation process using the error in the determination velocity;

calculating the position of the moving vehicle using the results of the calculation by the first unit and the results of the detection by the second unit and adjusting an ending time of the summing of the correlation integration values in a single correlation process based on the predetermined intervals of time and the correlation integration period.

* * * * *